(12) United States Patent
Miyamoto et al.

(10) Patent No.: US 10,972,621 B2
(45) Date of Patent: Apr. 6, 2021

(54) RECORDING APPARATUS

(71) Applicant: SEIKO EPSON CORPORATION, Tokyo (JP)

(72) Inventors: Shintaro Miyamoto, Shiojiri (JP); Kensuke Tamai, Shiojiri (JP); Kazunori Takabayashi, Okaya (JP); Yoshiyuki Okazawa, Shiojiri (JP); Yoshikazu Nagai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/823,961

(22) Filed: Mar. 19, 2020

(65) Prior Publication Data
US 2020/0304666 A1 Sep. 24, 2020

(30) Foreign Application Priority Data

Mar. 22, 2019 (JP) .............................. JP2019-054932

(51) Int. Cl.
*H04N 1/00* (2006.01)
(52) U.S. Cl.
CPC ..... *H04N 1/00562* (2013.01); *H04N 1/00559* (2013.01); *H04N 1/00567* (2013.01)
(58) Field of Classification Search
None
See application file for complete search history.

(56) References Cited

U.S. PATENT DOCUMENTS

| | | | |
|---|---|---|---|
| 8,107,852 B2 * | 1/2012 | Ito | G03G 15/60 399/110 |
| 9,118,830 B2 * | 8/2015 | Okazawa | H04N 1/0402 |
| 9,204,001 B2 * | 12/2015 | Shiomi | H04N 1/1013 |
| 10,469,683 B2 * | 11/2019 | Namba | B41J 29/02 |
| 2013/0188209 A1 | 7/2013 | Horikawa et al. | |
| 2014/0168680 A1 | 6/2014 | Shiomi | |
| 2017/0251117 A1 * | 8/2017 | Shirota | H04N 1/00551 |
| 2018/0097948 A1 | 4/2018 | Namba | |

FOREIGN PATENT DOCUMENTS

| | | |
|---|---|---|
| JP | 2013-150247 A | 8/2013 |
| JP | 2014-120864 A | 6/2014 |
| JP | 2018-052003 A | 4/2018 |

OTHER PUBLICATIONS

Copending U.S. Appl. No. 16/795,824 to Akahame, filed Feb. 20, 2020.*

\* cited by examiner

*Primary Examiner* — Paul F Payer
(74) *Attorney, Agent, or Firm* — Workman Nydegger

(57) ABSTRACT

A printer includes: a restriction unit that is in a rotation allowing state in which opening of a scanner unit from a closed state is allowed when a panel unit is in a first posture and is in a restriction state in which opening of the scanner unit from the closed state is restricted when the panel unit is tilted from the first posture to a second posture; and a posture holding unit that is in a tiltable state in which the posture of the panel unit is tilted from the first posture to the second posture when the scanner unit is in a closed state and is in a posture holding state in which the posture of the panel unit is held in the first posture when the scanner unit is rotated from the closed state in an opening direction.

6 Claims, 20 Drawing Sheets

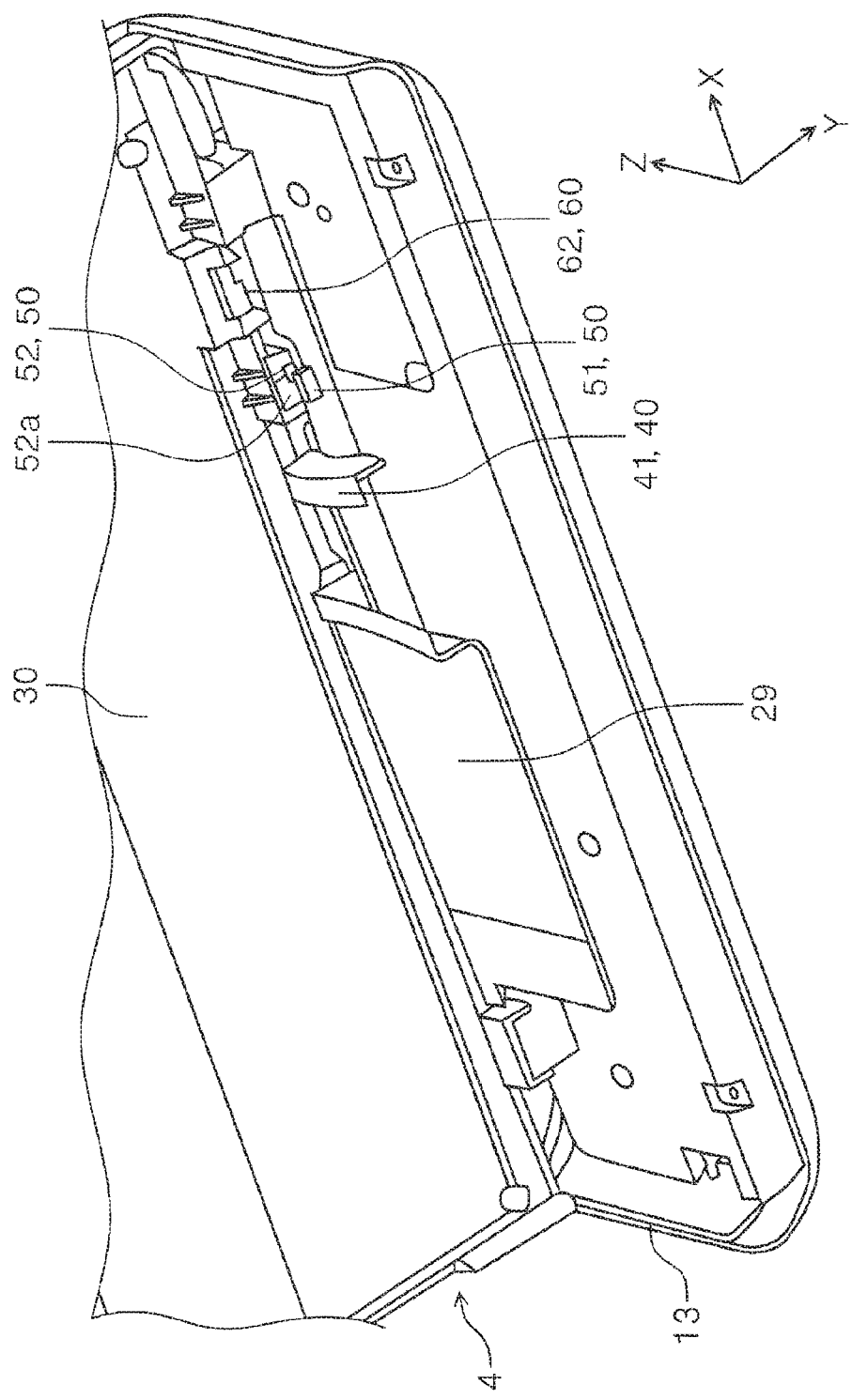

RECORDING APPARATUS

The present application is based on, and claims priority from JP Application Serial Number 2019-054932, filed Mar. 22, 2019, the disclosure of which is hereby incorporated by reference herein in its entirety.

BACKGROUND

1. Technical Field

The present disclosure relates to a recording apparatus having both a recording function for a medium and a reading function for reading a document.

2. Related Art

A recording apparatus represented by a printer is configured as a multifunction machine that is provided with a scanner unit above an apparatus body including a recording unit that performs recording on a medium, and has both a recording function for a medium and a reading function for reading a document.

As disclosed in JP-A-2018-052003 as an example, such a recording apparatus includes a manipulation panel having a display unit that displays predetermined information and a button unit that inputs predetermined information, in which the manipulation panel is configured to be tiltable such that a user easily manipulates the manipulation panel. The manipulation panel disclosed in JP-A-2018-052003 is provided on a side surface of the apparatus, and a tilting shaft is provided along an upper edge of the rectangular manipulation panel. The manipulation panel is configured to be in an inclined posture by rotating such that a manipulation surface faces the upper side.

Further, as disclosed in JP-A-2014-120864 as an example, the recording apparatus configured as a multifunction machine may be configured such that the scanner unit is rotatable to open and close an upper portion of the apparatus body, the inside of the apparatus body is opened by opening the scanner unit, and maintenance or the like is performed. In the multifunction machine disclosed in JP-A-2014-120864, a manipulation panel is provided at a free end side of the scanner unit that rotates with respect to the apparatus body. In the multifunction machine disclosed in JP-A-2014-120864, when the scanner unit rotates, the manipulation panel is displaced integrally with the scanner unit.

As in JP-A-2014-120864, when the manipulation panel provided in the scanner unit that rotates with respect to the apparatus body is configured to be tiltable by rotating such that the manipulation surface faces the upper side as in the manipulation panel disclosed in JP-A-2018-052003, the manipulation panel is tilted in a state in which the scanner unit is closed with respect to the apparatus body, and the scanner unit may be opened as it is. When the scanner unit is opened while the manipulation panel is tilted, it is difficult for the user to see the manipulation surface, and thus manipulability may be reduced.

SUMMARY

A recording apparatus according to the present disclosure that solves the above problems includes: a recording unit that performs recording on a medium; a housing including the recording unit therein; a scanner unit that includes a document stand on which a document is placed and a reading unit that reads the document placed on the document stand, is provided to be rotatable with respect to the housing, and is configured to open and close an upper portion of the housing through rotation; a panel unit that is provided in a free end of the scanner unit and is configured to be tilted between a first posture and a second posture in which the panel unit is more parallel to the document stand than the first posture; a restriction unit that is configured to switch between a restriction state in which rotation of the scanner unit in an opening direction from a closed state in which the scanner unit is closed with respect to the housing is restricted and a rotation allowing state in which the rotating of the scanner unit in the opening direction from the closed state is allowed, the restriction unit being in the rotation allowing state when the panel unit is in the first posture and being in the restriction state when the panel unit is tilted from the first posture to the second posture; and a posture holding unit that is configured to switch between a posture holding state in which a posture of the panel unit with respect to the scanner unit is held in the first posture and a tiltable state in which the posture of the panel unit with respect to the scanner unit is configured to be tilted from the first posture to the second posture, the posture holding unit being switched to the tiltable state when the scanner unit is in the closed state and being switched to the posture holding state when the scanner unit is rotated in the opening direction from the closed state.

BRIEF DESCRIPTION OF THE DRAWINGS

FIG. 20 is a perspective view of the scanner unit and the panel unit when viewed from the lower side.

DESCRIPTION OF EXEMPLARY EMBODIMENTS

Figure 1:
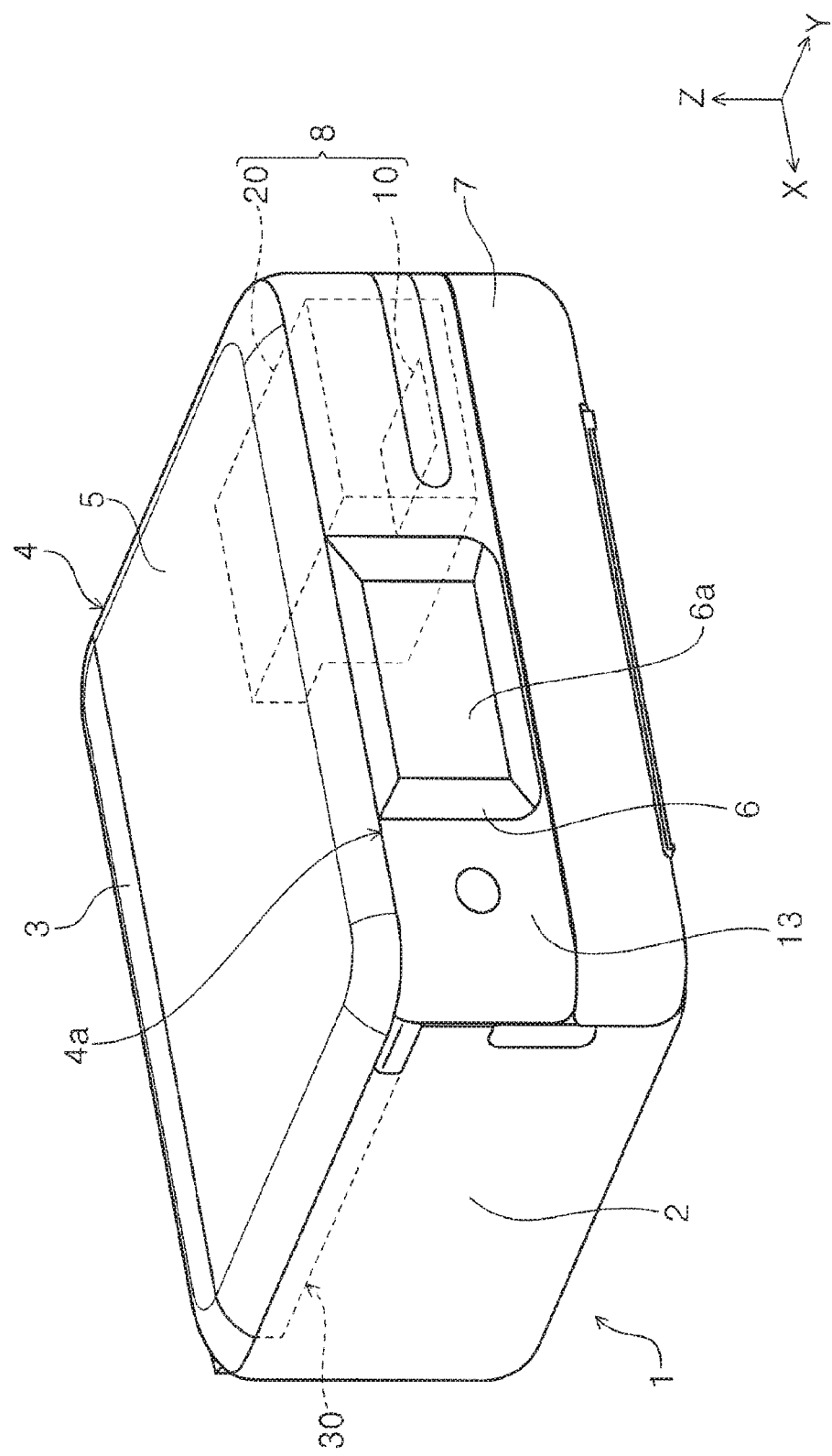
FIG. 1 is an external perspective view of a printer according to a first embodiment.

Hereinafter, the present disclosure will be schematically described.

A recording apparatus according to a first aspect includes: a recording unit that performs recording on a medium; a housing including the recording unit therein; a scanner unit that includes a document stand on which a document is placed and a reading unit that reads the document placed on the document stand, is provided to be rotatable with respect to the housing, and is configured to open and close an upper portion of the housing through rotation; a panel unit that is provided in a free end of the scanner unit and is configured to be tilted between a first posture and a second posture in which the panel unit is more parallel to the document stand than the first posture; a restriction unit that is configured to switch between a restriction state in which rotating of the scanner unit in an opening direction from a closed state in which the scanner unit is closed with respect to the housing is restricted and a rotation allowing state in which the rotating of the scanner unit in the opening direction from the closed state is allowed, the restriction unit being in the rotation allowing state when the panel unit is in the first posture and being in the restriction state when the panel unit is tilted from the first posture to the second posture; and a posture holding unit that is configured to switch between a posture holding state in which a posture of the panel unit with respect to the scanner unit is held in the first posture and a tiltable state in which the posture of the panel unit with respect to the scanner unit is configured to be tilted from the first posture to the second posture, the posture holding unit being switched to the tiltable state when the scanner unit is in the closed state and being switched to the posture holding state when the scanner unit is rotated in the opening direction from the closed state.

According to this aspect, the restriction unit is provided which can switch between the restriction state in which the rotating of the scanner unit in the opening direction from the closed state in which the scanner unit is closed with respect to the housing is restricted and the rotation allowing state in which the rotating of the scanner unit in the opening direction from the closed state is allowed. The restriction unit is in the rotation allowing state when the panel unit is in the first posture and is in the restriction state when the panel unit is tilted from the first posture to the second posture. Thus, when the panel unit is in the first posture, the scanner unit can be rotated from the closed state, and when the panel unit is tilted from the first posture to the second posture, the rotating of the scanner unit from the closed state can be restricted. Therefore, the scanner unit is opened while the panel unit is tilted, so that a reduction in manipulability due to difficulty for the user to see a panel surface can be prevented.

Further, the posture holding unit is provided which can switch between the posture holding state in which the posture of the panel unit with respect to the scanner unit is held in the first posture and the tiltable state in which the posture of the panel unit with respect to the scanner unit can be tilted from the first posture to the second posture. The posture holding unit is switched to the tiltable state when the scanner unit is in the closed state and is switched to the posture holding state when the scanner unit is rotated in the opening direction from the closed state. Thus, when the scanner unit is opened, the panel unit is held in the first posture, so that good visibility and manipulability of the panel surface when the scanner unit is opened can be held.

A second aspect of the present disclosure provides the recording apparatus according to the first aspect, in which the restriction unit includes a hook portion that is provided in the panel unit and is displaced following rotation of the panel unit and a restriction portion that is provided in the housing and restricts the rotation of the scanner unit with respect to the housing by hooking the hook portion, and the restriction unit is in the rotation allowing state as the hook portion is detached from the restriction portion when the panel unit is in the first posture, and is in the restriction state as the hook portion is hooked by the restriction portion when the panel unit is tilted from the first posture to the second posture.

According to the present aspect, the restriction unit can be formed with a simple configuration.

A third aspect of the present disclosure provides the recording apparatus according to the first aspect or the second aspect, further including a scanner holding unit including an elastically deformable reception unit that is provided in one of the housing and the scanner unit, and a to-be-received unit that is provided in the other one of the housing and the scanner unit where the reception unit is not provided and is received by the reception unit while the reception unit is elastically deformed, in which as the to-be-received unit is received by the reception unit when the scanner unit is in the closed state, the scanner unit is held in the closed state against a force of tilting the panel unit from the first posture to the second posture.

According to this aspect, since the scanner holding unit is provided, it is possible to prevent the scanner unit from being opened by a force of tilting the panel unit from the first posture.

A fourth aspect of the present disclosure provides the recording apparatus according to any one of the first aspect to the third aspect, in which the posture holding unit includes a recess portion that is provided in the panel unit, a rotation member that includes a protrusion portion configured to be inserted and extracted into and from the recess portion through rotation with respect to the scanner unit, a pressing member that presses the rotation member in a direction in which the protrusion portion is inserted into the recess portion, and a contact portion that is provided in the housing and is configured to contact the rotation member in a state in which the scanner unit is closed, wherein when the scanner unit is in an open state, the protrusion portion is inserted into the recess portion by a pressing force of the pressing member, so that the panel unit is in the posture holding state, and when the scanner unit is closed from the open state, the contact portion rotates the rotation member against the pressing force of the pressing member and the protrusion portion is extracted from the recess portion, so that the panel unit is in the tiltable state.

According to this aspect, the posture holding unit that switches between the posture holding state and the tiltable state of the panel unit in conjunction with the opening and closing of the scanner unit can be formed with a simple configuration.

A fifth aspect of the present disclosure provides the recording apparatus according to any one of the first aspect to the fourth aspect, in which the recording unit includes a recording head that ejects a liquid, and is configured to perform recording by ejecting the liquid from the recording head to the medium, and the housing includes a liquid storage unit therein that stores the liquid, and is configured such that when the scanner unit is in the open state, the liquid storage unit is configured to be replenished with the liquid.

According to this aspect, in addition to the same effects as those according to any one of the first aspect to the fourth aspect, when the liquid storage unit is replenished with the liquid, the scanner unit can be opened with good manipulability.

A sixth aspect of the present disclosure provides the recording apparatus according to the fifth aspect, in which the recording unit includes a carriage which supports the recording head and on which the liquid storage unit is configured to be mounted.

According to this aspect, in the recording apparatus in which the liquid storage unit is mounted on the carriage that supports the recording head, the same effects as those according to the fifth aspect can be obtained.

First Embodiment

Hereinafter, an outline of a recording apparatus according to an embodiment of the present disclosure will be described with reference to the drawings. In the present embodiment, an ink jet printer 1 is described as an example of the recording apparatus. Hereinafter, the ink jet printer 1 is simply referred to as a printer 1.

In an XYZ coordinate system illustrated in each drawing, an X-axis direction indicates an apparatus width direction, a Y-axis direction indicates an apparatus depth direction, and a Z-axis direction indicates an apparatus height direction. Further, the +Y direction indicates a forward direction with respect to the apparatus, and the −Y direction indicates a rearward direction with respect to the apparatus. Further, when viewed from the forward direction with respect to the apparatus, a leftward direction indicates the +X direction, and a rightward direction indicates the −X direction. Further, the +Z direction indicates an upward direction, and the −Z direction indicates a downward direction.

Further, in the printer 1, a transport direction in which a medium is transported is referred to as a "downstream direction", and a direction that is opposite thereto is referred to as an "upstream direction".

Outline of Printer

The printer 1 illustrated in FIG. 1 includes a housing 2 that includes a recording unit 8 that performs recording on a medium, and a scanner unit 4 that is provided on the housing 2 and reads an image of a document. That is, the printer 1 is configured as a multi-function machine having an image reading function in addition to a recording function.

In the printer 1, examples of the medium on which the recording is performed include, in addition to a plain paper, a thick paper that is thicker than the plain paper, such as a postcard and a business card, a thin paper that is thinner than the plain paper, a glossy paper for photography, and the like. Further, the printer 1 is configured to also perform the recording on a label surface of a disc-type memory such as a CD and a DVD.

In the printer 1, the recording unit 8 includes a recording head 10 that ejects an ink as a liquid, and a carriage 20 that supports the recording head 10, and is configured to perform the recording by ejecting the ink from the recording head 10 toward the medium P.

Figure 3:
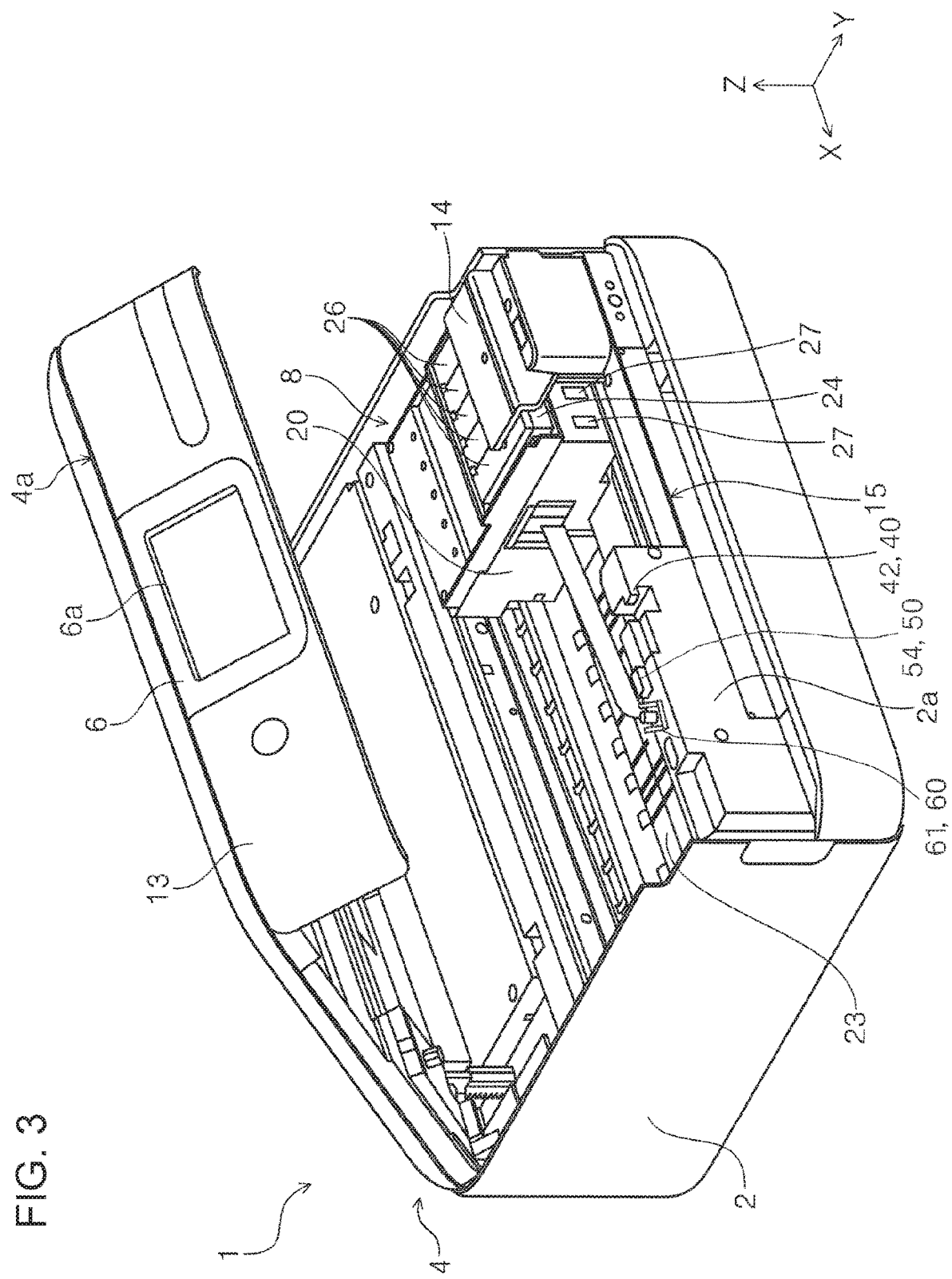
FIG. 3 is a perspective view illustrating a state in which a scanner unit is completely opened in the printer according to the first embodiment.

The scanner unit 4 is provided to be rotatable with respect to the housing 2 and is configured to be able to open and close an upper portion of the housing 2 through rotation. FIG. 1 illustrates a closed state in which the scanner unit 4 is closed with respect to the housing 2, and FIG. 3 illustrates an opened state in which the scanner unit 4 is completely opened with respect to the housing 2.

In FIG. 1, a panel unit 13 including a manipulation unit 6 is provided in the +Y direction that is the forward direction of the printer 1. The manipulation unit 6 can perform preview display of setting contents or an image in addition to various setting manipulations and execution manipulations for recording and image reading.

Figure 2:
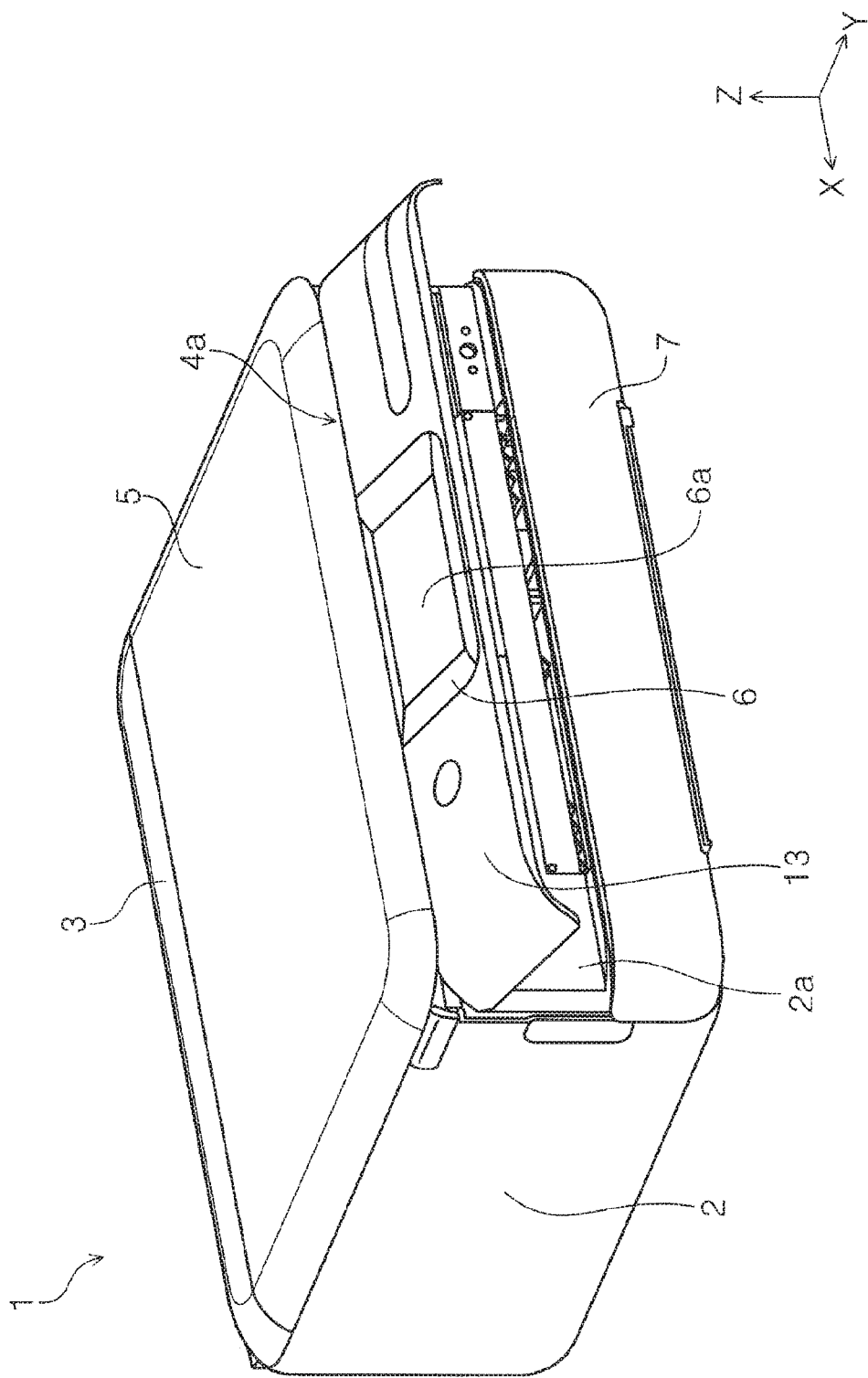
FIG. 2 is a perspective view illustrating a state in which a panel unit is in a tilted posture in a printer according to a first embodiment.

The panel unit 13 is provided in the scanner unit 4, and is tilted from a state in which a manipulation surface 6a as a panel surface faces the front side as illustrated in FIG. 1 to a state in which the manipulation surface 6a faces the upper side from the state of FIG. 1 as illustrated in FIG. 2.

Configurations of the scanner unit 4 and the panel unit 13 will be described in detail later.

A lower cover 7 is provided at a lower portion of a front surface 2a of the housing 2. The front surface 2a of the housing 2 is not visible in FIG. 1 but is illustrated in FIGS. 2 and 3.

Figure 5:
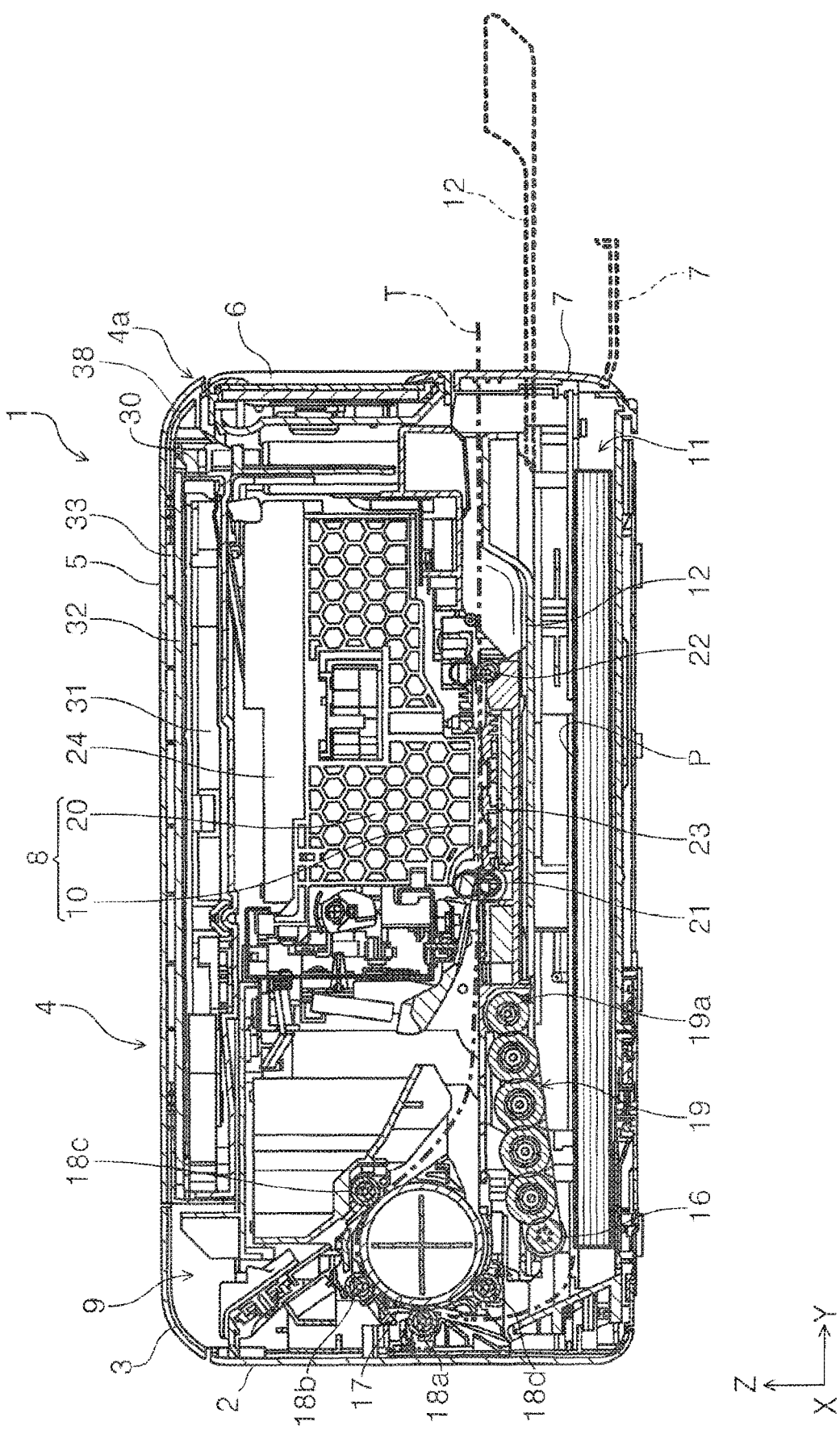
FIG. 5 is a side sectional view of the printer according to the first embodiment.

By opening the lower cover 7 as indicated by a dotted line in FIG. 5, a medium tray 11 for storing the medium P before the recording and a discharge tray 12 for receiving the medium P discharged after the recording are exposed.

The discharge tray 12 can switch between a storage state in which the discharge tray 12 is stored in the housing 2 as indicated by a solid line in FIG. 5 and a protrusion state in which the discharge tray 12 protrudes toward the front side of the housing 2 as indicated by a dotted line in FIG. 5, and can receive the medium P after recording in the protrusion state. The discharge tray 12 is configured to be switchable between the storage state and the protrusion state by a motor that is not illustrated.

The medium tray 11 can store a plurality of media P, and is detachable from the housing 2. As illustrated in FIG. 5, the medium tray 11 can send the medium P to a medium transport path T, which will be described below, while being mounted on the housing 2. Further, the medium tray 11 can be replenished with the medium P while being pulled out forward (in the +Y direction).

In Medium Transport Path in Printer

Next, the medium transport path T of the printer 1 will be described with reference to FIG. 5. The medium transport path T is a transport path for the medium P transported from the medium tray 11 provided at a lower portion of the printer 1 toward a recording area by the recording unit 8.

The medium P set on the medium tray 11 is picked up by the feeding roller 16 and is sent out to the medium transport path T. In more detail, the feeding roller 16 that is rotationally driven by the drive source that is not illustrated is provided in a roller support member 19 that swings about a swing shaft 19a, rotates while being in contact with the uppermost medium P of the plurality of media P stored in the medium tray 11, and sends out the uppermost medium P from the medium tray 11 in the rearward direction with respect to the apparatus (in the −Y direction).

An intermediate roller 17 that is rotationally driven by the drive source that is not illustrated is provided downstream of the feeding roller 16, and the medium P is curved and reversed by the intermediate roller 17, and is sent in the forward direction with respect to the apparatus (in the +Y direction). Reference numerals 18a, 18b, 18c, and 18d are driven rollers that can be driven and rotated by the intermediate roller 17, and the medium is nipped by the driven roller 18a and the intermediate roller 17, is nipped by the driven roller 18b and the intermediate roller 17, is then nipped by the driven roller 18c and the intermediate roller 17, and is sent downstream. The driven roller 18d will be described later.

A transport roller pair 21 is provided downstream of the intermediate roller 17, and the medium P is sent to a lower side of the recording head 10 by the transport roller pair 21. In FIG. 5, in the transport roller pair 21, a lower roller is rotationally driven by the drive source that is not illustrated, and an upper roller is driven and rotated by the lower roller.

The recording unit 8 is provided downstream of the transport roller pair 21. In the recording unit 8, the recording head 10 that ejects the ink is provided at the bottom of the carriage 20. A liquid storage unit 24 for accommodating the ink supplied to the recording head 10 is mounted on the carriage 20. In other words, the housing 2 includes the liquid storage unit 24 therein.

The carriage 20 is configured to reciprocate in the apparatus width direction (the X axis direction) by a drive source that is not illustrated.

A medium support member 23 that supports a medium transported through the medium transport path T is provided at a position facing the recording head 10, and an interval between the medium and the recording head 10 is defined by the medium support member 23. The interval between the medium and the recording head 10 is also referred to as a gap.

A discharge roller pair 22 is provided downstream of the medium support member 23. Similar to the transport roller pair 21, the discharge roller pair 22 is also configured such that a lower roller is rotationally driven by the drive source that is not illustrated, and an upper roller is driven and rotated by the lower roller. The medium P after recording by the recording unit 8 is discharged toward the discharge tray 12 in the protrusion state by the discharge roller pair 22, as indicated by a dotted line in FIG. 5.

The printer 1 is configured to be able to perform double-sided recording in which recording is performed on a first surface of the medium P and a second surface opposite to the first surface. When performing the double-sided recording, after the recording on the first surface, the medium P is switched back and is sent in the −Y direction. The switched-back medium P can be nipped by the driven roller 18d and the intermediate roller 17 and can be joined to the medium transport path T. The medium P is reversed by the intermediate roller 17 and is transported to the lower side of the recording head 10 in a state in which the second surface faces the recording head 10, and the recording is performed on the second surface.

Further, the printer 1 is configured to be able to supply the medium P, on which the recording is performed, also from an upper supply port 9 provided at an upper portion in the rearward direction with respect to the apparatus. The upper supply port 9 is opened by opening a feeding port cover 3. The medium P supplied from the upper supply port 9 enters the medium transport path T upstream of the transport roller pair 21, and the recording on the medium P is performed by the recording head 10.

In Scanner Unit

In the printer 1, as illustrated in FIG. 3, the scanner unit 4 is provided to be rotatable with respect to the upper portion of the housing 2. The scanner unit 4 has a rotary shaft in the rearward direction of the apparatus, that is, in the −Y direction, and is configured to be able to open and close an upper portion of the housing 2 by rotating with a front side of the apparatus, that is, the +Y direction, as a free end 4a.

Figure 6:
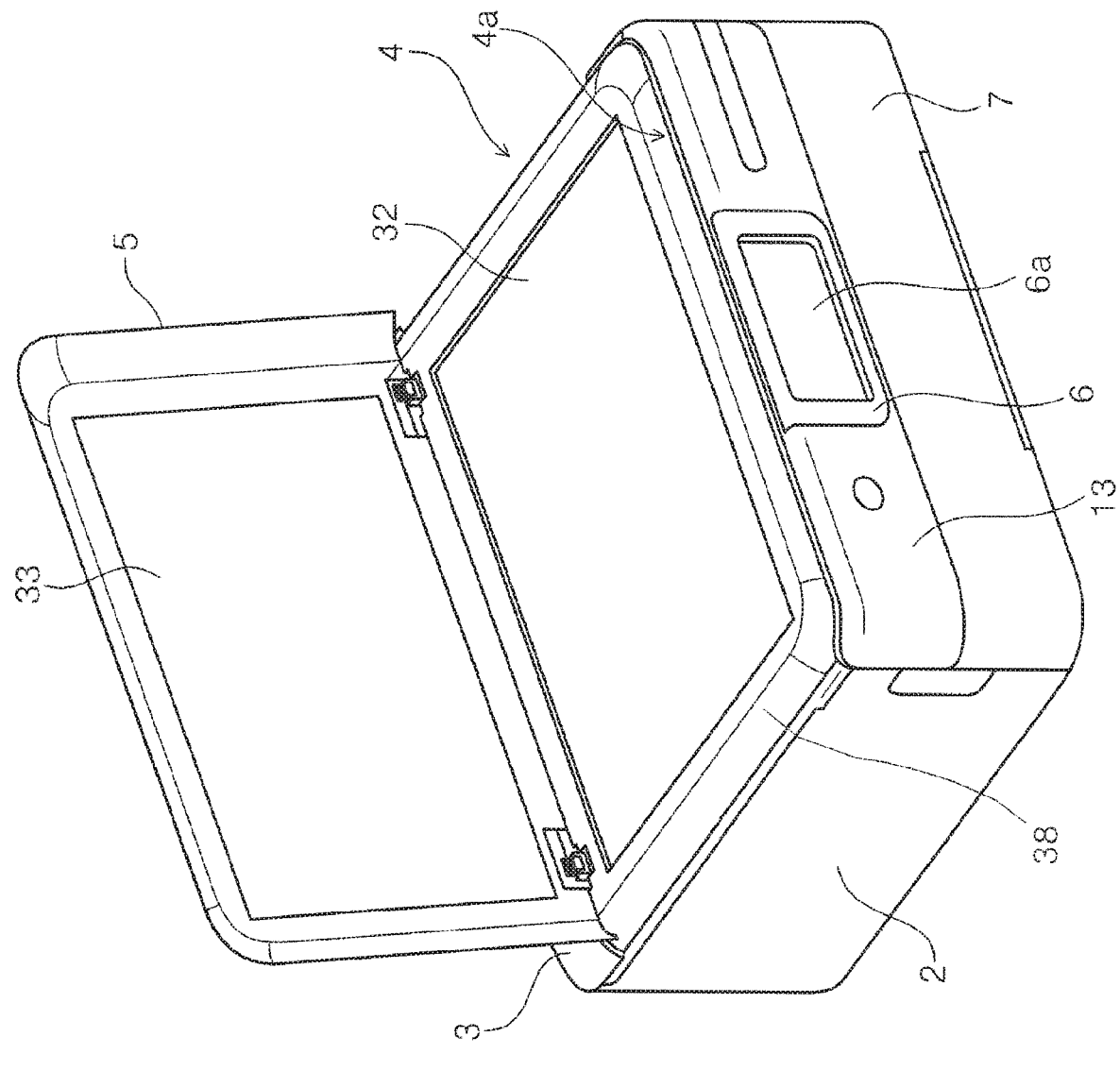
FIG. 6 is a perspective view illustrating a state in which a document stand cover of the scanner unit in the printer is opened according to the first embodiment.

As illustrated in FIG. 5, the scanner unit 4 includes a scanner body 30 including a reading section 31 therein serving as a reading unit for reading a document, a document stand 32 on which a document is placed, and a document stand cover 5 that can open and close the document stand 32. When the document stand cover 5 is opened as illustrated in FIG. 6, the document stand 32 is exposed. The reading section 31 reads a document placed on the document stand 32. The document is placed on the document stand 32 in a state in which a reading surface faces the document stand 32.

In the scanner unit 4, the document stand 32 is disposed on the scanner body 30 as illustrated in FIGS. 5 and 6, and the outer periphery of four sides is pressed by a frame member 38.

When the document stand cover 5 is closed, as illustrated in FIG. 6, a presser plate 33 that presses the document is provided on a surface facing the document stand 32.

The panel unit 13 is provided in the scanner body 30, and the document stand cover 5 can be opened and closed alone.

In Panel Unit

As described above, the panel unit 13 is provided to be rotatable with respect to the scanner body 30 of the scanner unit 4. In more detail, the panel unit 13 is configured to be tiltable between a first posture illustrated in FIG. 1 and a second posture in which the panel unit 13 is more parallel to the document stand 32 (see FIG. 6) than the first posture as illustrated in FIG. 2. When the scanner unit 4 is closed, in the scanner unit 4 in the first posture, the manipulation surface 6a is disposed along the side surface of the front side of the housing 2, that is, the front surface 2a (see FIG. 2). When the panel unit 13 is tilted from the first posture (see FIG. 1) to the second posture (see FIG. 2), the panel unit 13 is tilted in a direction in which the manipulation surface 6a faces the upper side.

In the present embodiment, the panel unit 13 is configured to be tiltable up to 80° in a direction in which the manipulation surface 6a faces the upper side while a state of the first posture illustrated in FIG. 1 is set as 0°. FIG. 2 illustrates a state in which the panel unit 13 is tilted at an inclination angle of 80°.

Further, in the printer 1, the panel unit 13 is provided at the free end 4a of the scanner unit 4. Accordingly, a rotation direction of the scanner unit 4 and a rotation direction of the panel unit 13 are the same, and operability of the printer 1 in a state in which the user looks at the panel unit 13 from the front side is improved.

Here, for example, as illustrated in FIG. 2, when the panel unit 13 is tilted in a state in which the scanner unit 4 is closed with respect to the housing 2 and the scanner unit 4 is opened as it is, it is difficult for the user to see the manipulation surface 6a, and thus manipulability may be reduced.

Figure 10:
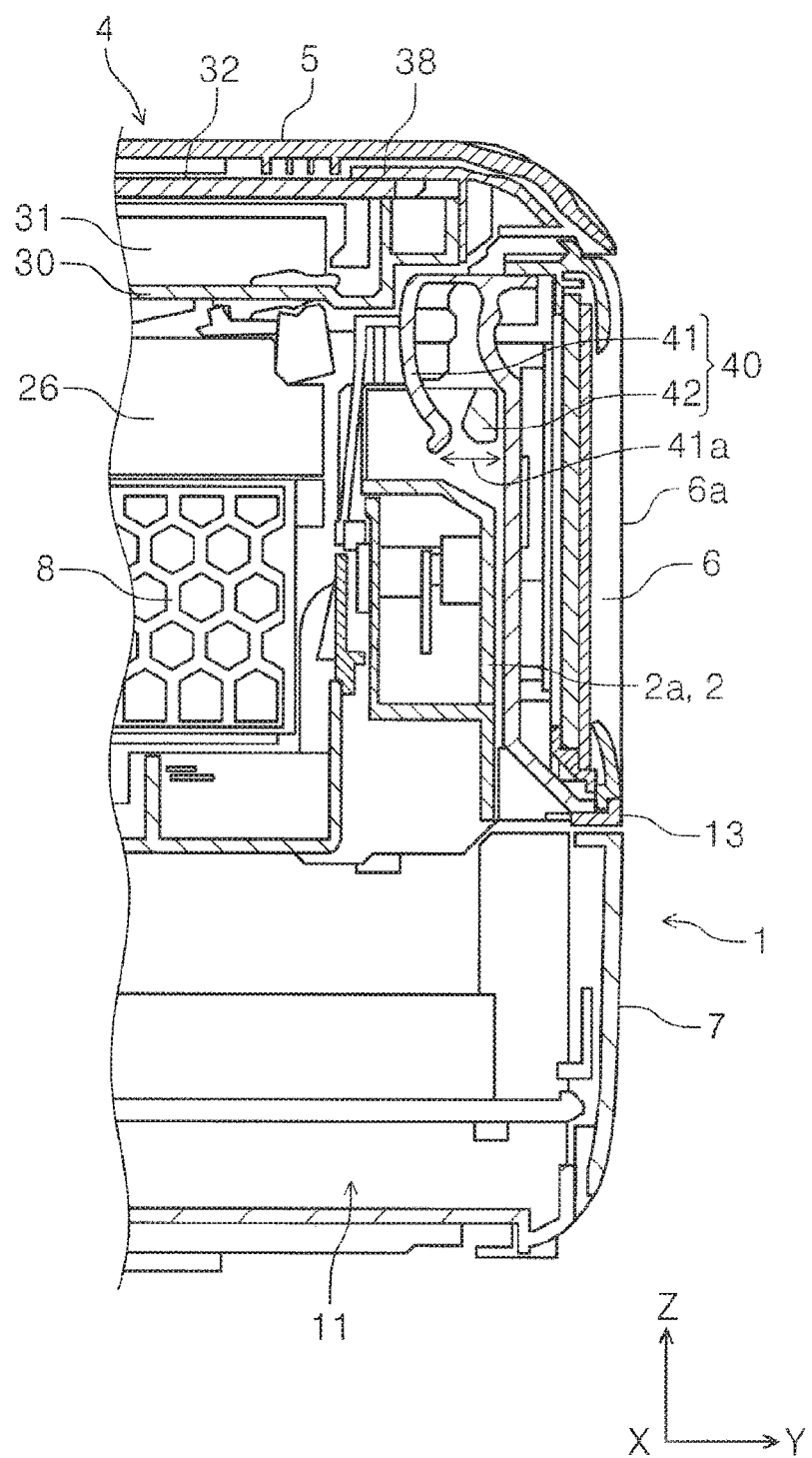
FIG. 10 is a sectional view illustrating a state in which the panel unit is in a first posture.
Figure 11:
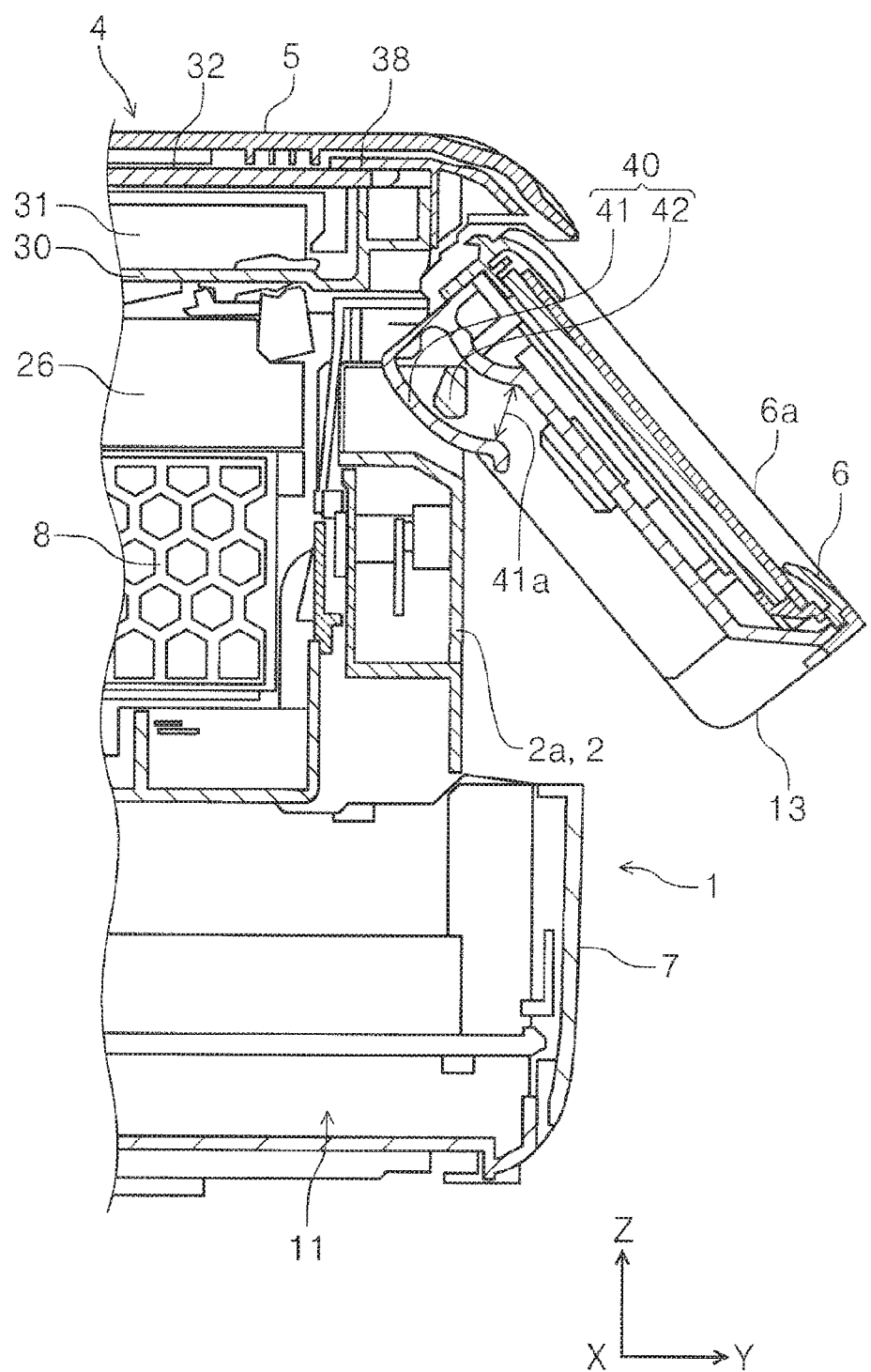
FIG. 11 is a sectional view illustrating a state in which the panel unit is tilted from the first posture.
Figure 14:
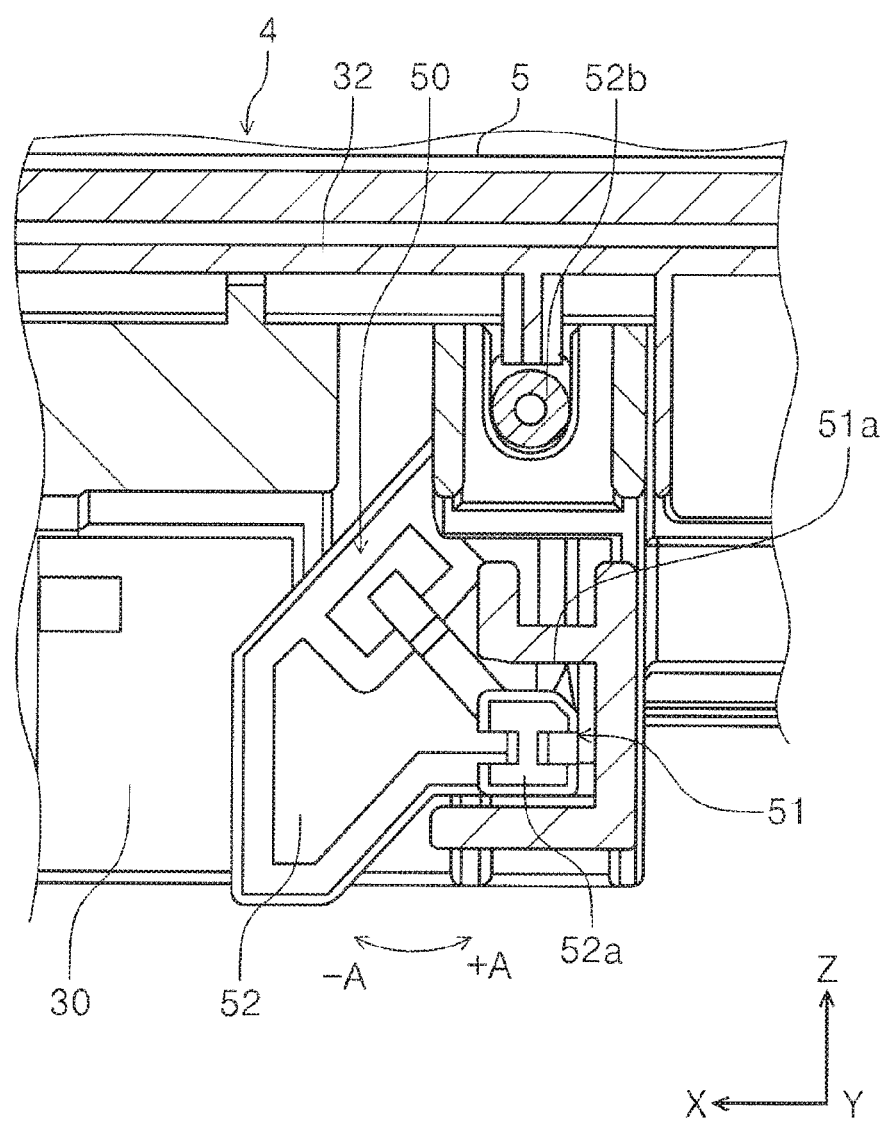
FIG. 14 is a front view illustrating a posture holding unit when the scanner unit is opened.
Figure 15:
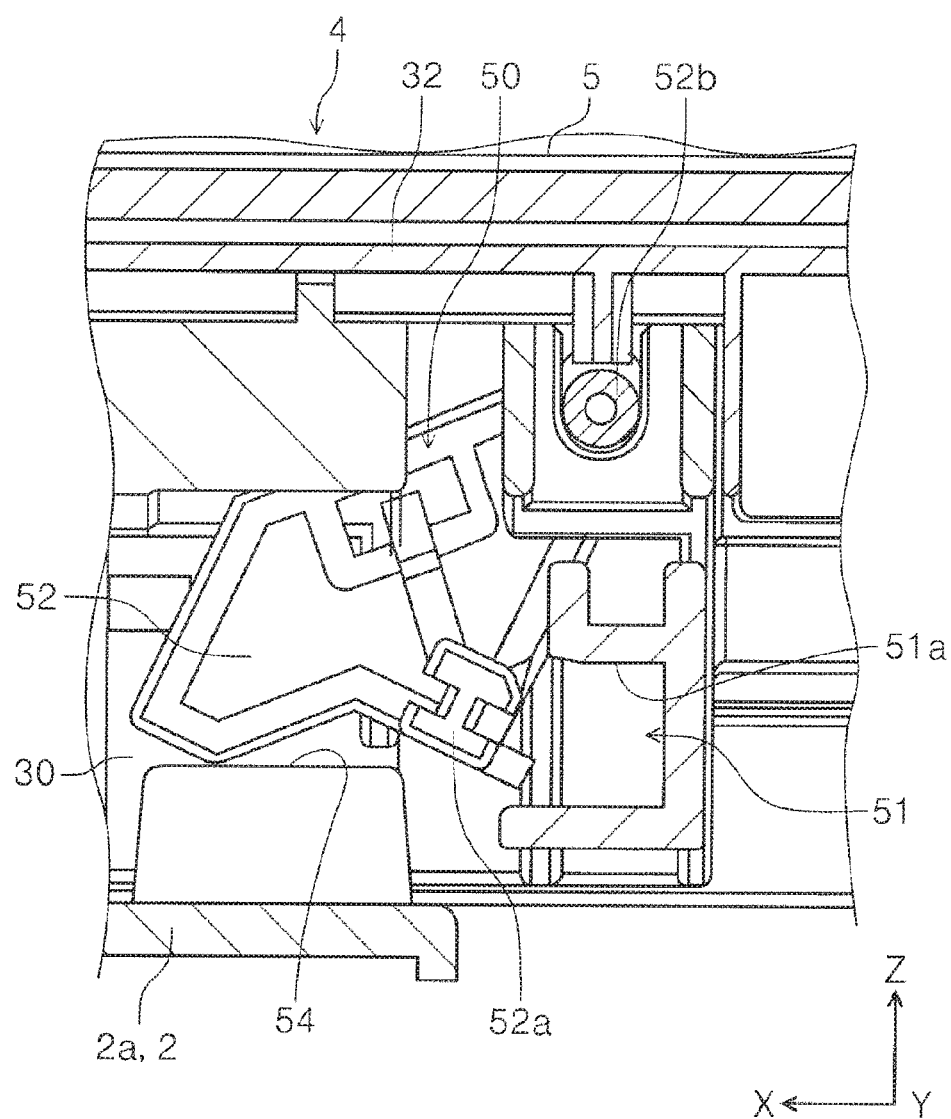
FIG. 15 is a front view illustrating the posture holding unit when the scanner unit is in a closed state.

In order to prevent this problem, the printer 1 according to the present embodiment includes a restriction unit 40 illustrated in FIGS. 10 and 11 and a posture holding unit 50 illustrated in FIGS. 14 and 15.

The restriction unit 40 can switch between a restriction state in which rotating of the scanner unit 4 in an opening direction from a closed state in which the scanner unit 4 is closed with respect to the housing 2 is restricted and a rotation allowing state in which the rotating of the scanner unit 4 in the opening direction from the closed state is allowed. The restriction unit 40 is switched to the rotation allowing state when the panel unit 13 is in the first posture and is switched to the restriction state when the panel unit 13 is tilted from the first posture to the second posture.

The posture holding unit 50 can switch between a posture holding state in which the posture of the panel unit 13 with respect to the scanner unit 4 is held in the first posture and a tiltable state in which the posture of the panel unit 13 with respect to the scanner unit 4 can be tilted from the first posture to the second posture. The posture holding unit 50 is switched to the tiltable state when the scanner unit 4 is in the closed state and is switched to the posture holding state when the scanner unit 4 is rotated in the opening direction from the closed state.

In other words, only when the panel unit 13 is in the first posture illustrated in FIG. 1, the printer 1 includes the restriction unit 40 that enables the scanner unit 4 to rotate in the opening direction from the closed state as illustrated in FIG. 3 and the posture holding unit 50 that holds the panel unit 13 in the first posture in the state of FIG. 3 in which the scanner unit 4 is opened.

As the restriction unit 40 is provided, the scanner unit 4 can be opened only when the panel unit 13 is in the first posture. Therefore, the scanner unit 4 is opened while the panel unit 13 is tilted, so that a reduction in the manipulability due to difficulty for the user to see the manipulation surface 6a can be prevented.

Further, as the posture holding unit 50 is provided, the posture of the panel unit 13 is held in the first posture when the scanner unit 4 is opened, and good visibility and manipulability of the manipulation surface 6a are maintained. Further, since the panel unit 13 can be tilted only when the scanner unit 4 is in the closed state, a possibility that the scanner unit 4 is inadvertently closed in an attempt to rotate the panel unit 13 in a state in which the scanner unit 4 is opened can be reduced.

Hereinafter, detailed configurations of the restriction unit 40 and the posture holding unit 50 will be described with reference to the drawings.

In Restriction Unit

Figure 7:
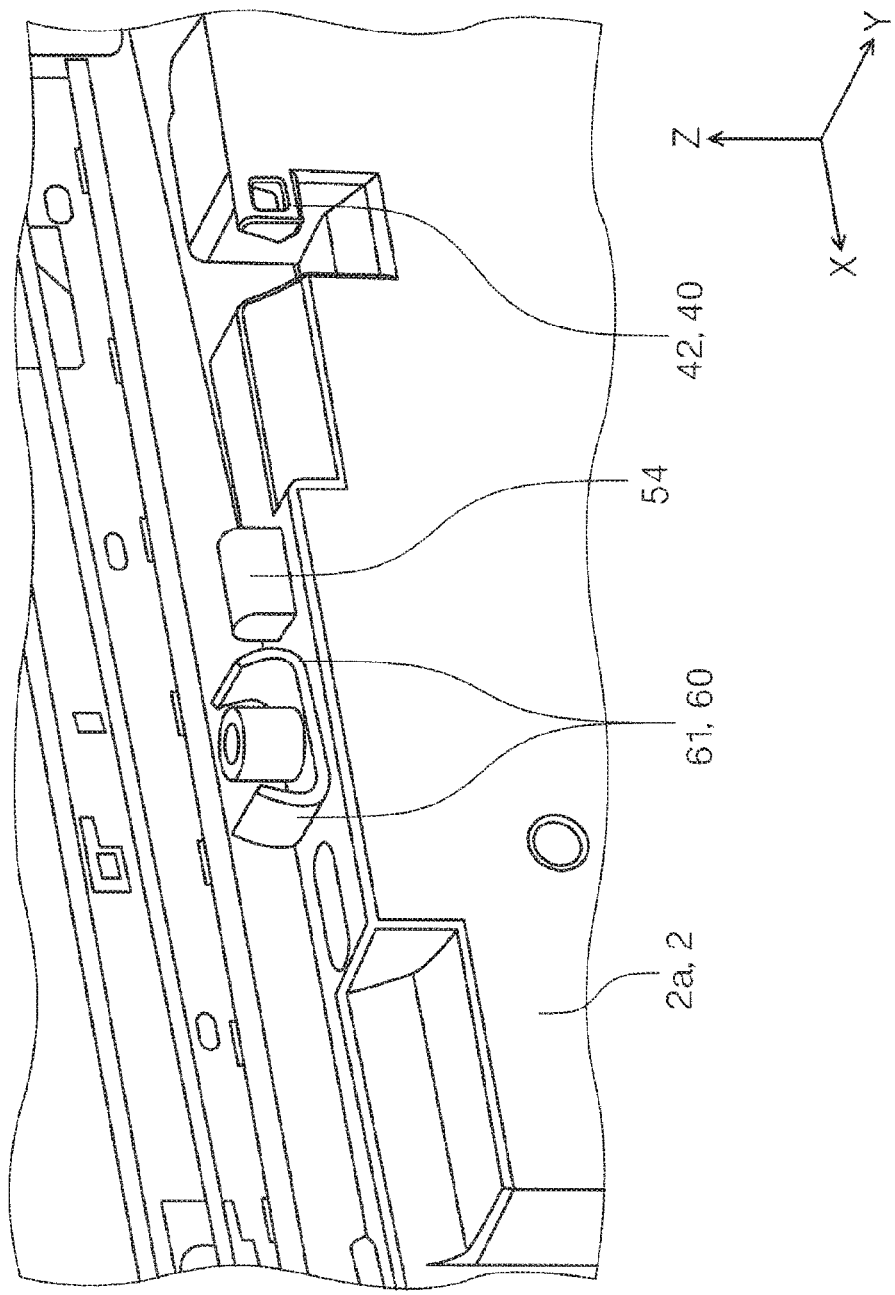
FIG. 7 is an enlarged perspective view of a main part of the front surface of a housing.
Figure 8:
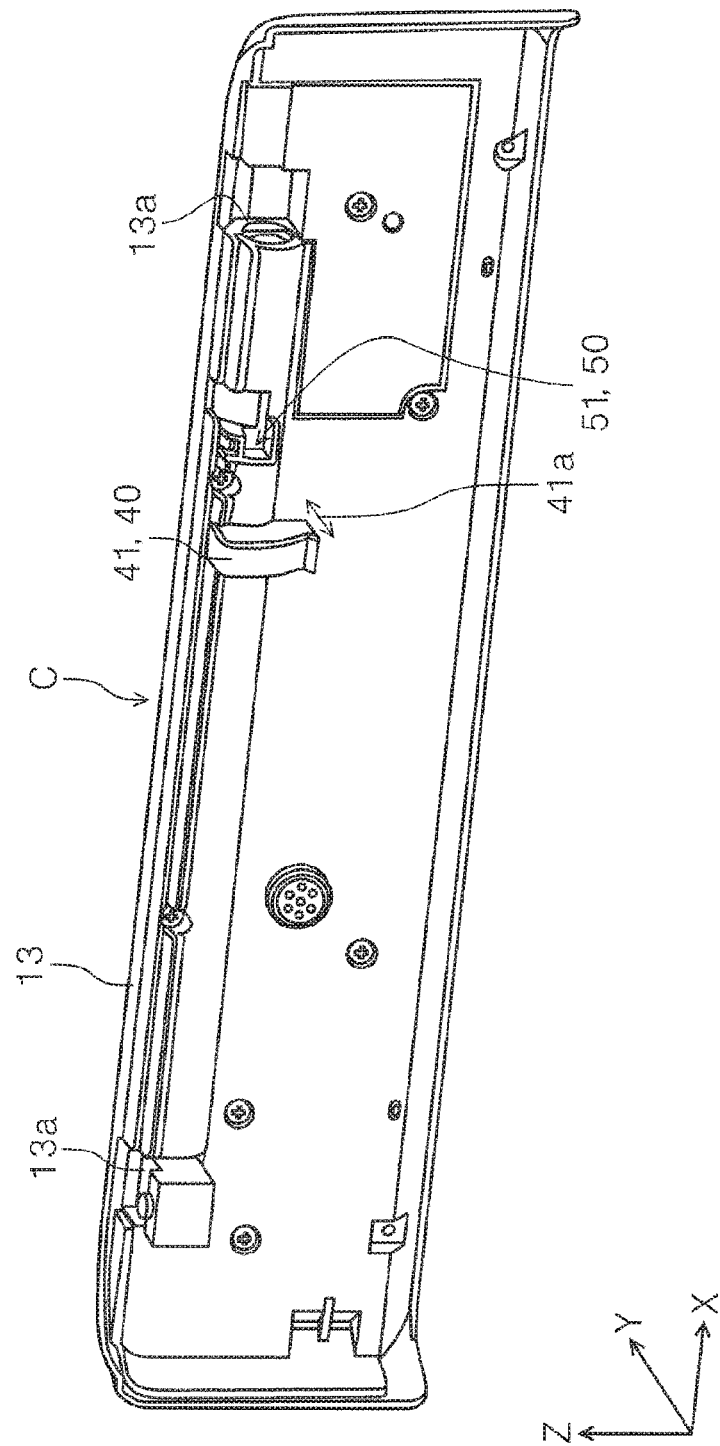
FIG. 8 is a perspective view of the panel unit when viewed from the rear side.
Figure 9:
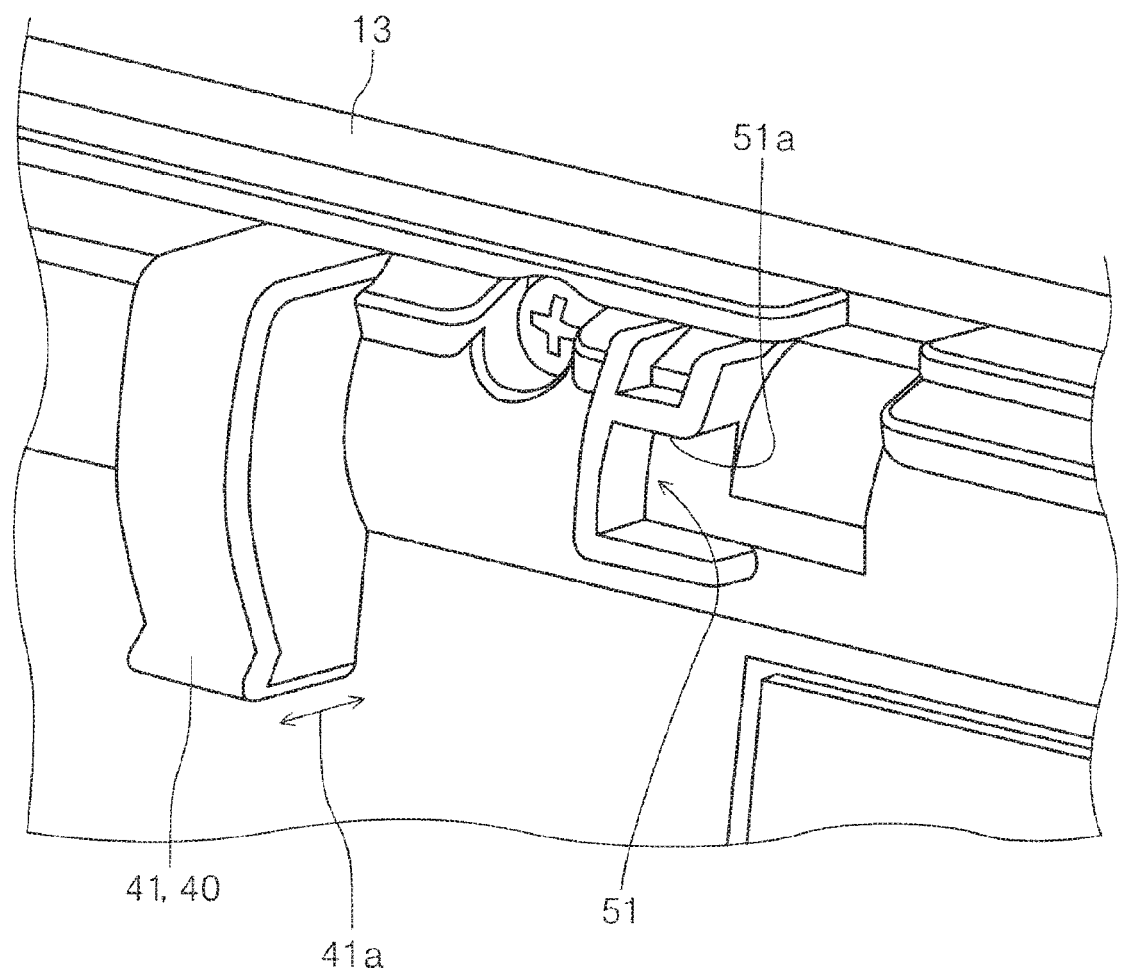
FIG. 9 is an enlarged perspective view of a main part of FIG. 8.

In the present embodiment, the restriction unit 40 includes a hook portion 41 that is provided in the panel unit 13 as illustrated in FIGS. 8 and 9 and is displaced following the rotation of the panel unit 13 and a restriction portion 42 that is provided on the front surface 2a of the housing 2 as illustrated in FIG. 7 and restricts the rotation of the scanner unit 4 with respect to the housing 2 by hooking the hook portion 41 as illustrated in FIG. 11. The hook portion 41 is provided on the rear surface of the panel unit 13. Further, in FIG. 8, reference numeral 13a denotes a bearing 13a that receives a shaft portion that is provided in the scanner body 30 of the scanner unit 4 and is not illustrated. The shaft portion received by the bearing 13a serves as a rotation center of the panel unit 13. One hook portion 41 as the restriction unit 40 is provided at a position closer to a central portion C than to an end portion of the panel unit 13 in the width direction (the X axis direction). One restriction portion 42 is provided at a position corresponding to the hook portion 41 in the width direction of the housing 2 illustrated in FIG. 3.

As illustrated in FIGS. 9 and 10, the hook portion 41 extends from an upper portion of the panel unit 13, and is formed to have an opening portion 41a on a lower side thereof.

FIG. 10 illustrates a state in which the scanner unit 4 is in the closed state and the panel unit 13 is in the first posture. At this time, the opening portion 41a of the hook portion 41 is located below the restriction portion 42. When the scanner unit 4 is rotated in the opening direction, the hook portion 41 is in a state in which the hook portion 41 does not interfere with the restriction portion 42, that is, in a state in which the hook portion 41 is detached from the restriction portion 42. Therefore, in this state, the scanner unit 4 can be opened.

FIG. 11 illustrates a state in which the scanner unit 4 is in the closed state and the panel unit 13 is in a tilted posture in which the panel unit 13 is rotated from the first posture. When the panel unit 13 is tilted, the hook portion 41 is hooked by the restriction portion 42 as illustrated in FIG. 11, and when the scanner unit 4 is rotated in the opening direction, the hook portion 41 interferes with the restriction portion 42, so that the rotation of the scanner unit 4 is restricted. Therefore, the scanner unit 4 cannot be opened.

That is, the restriction unit 40 is in the rotation allowing state in which when the panel unit 13 is in the first posture, the hook portion 41 is detached from the restriction portion 42, so that the rotation of the scanner unit 4 is allowed, and is in the restriction state in which when the panel unit 13 is tilted from the first posture to the second posture, the hook portion 41 is hooked by the restriction portion 42, so that the rotation of the scanner unit 4 is restricted.

With the above configuration, the restriction unit 40 can be formed with a simple configuration.

In Posture Holding Unit

Figure 13:
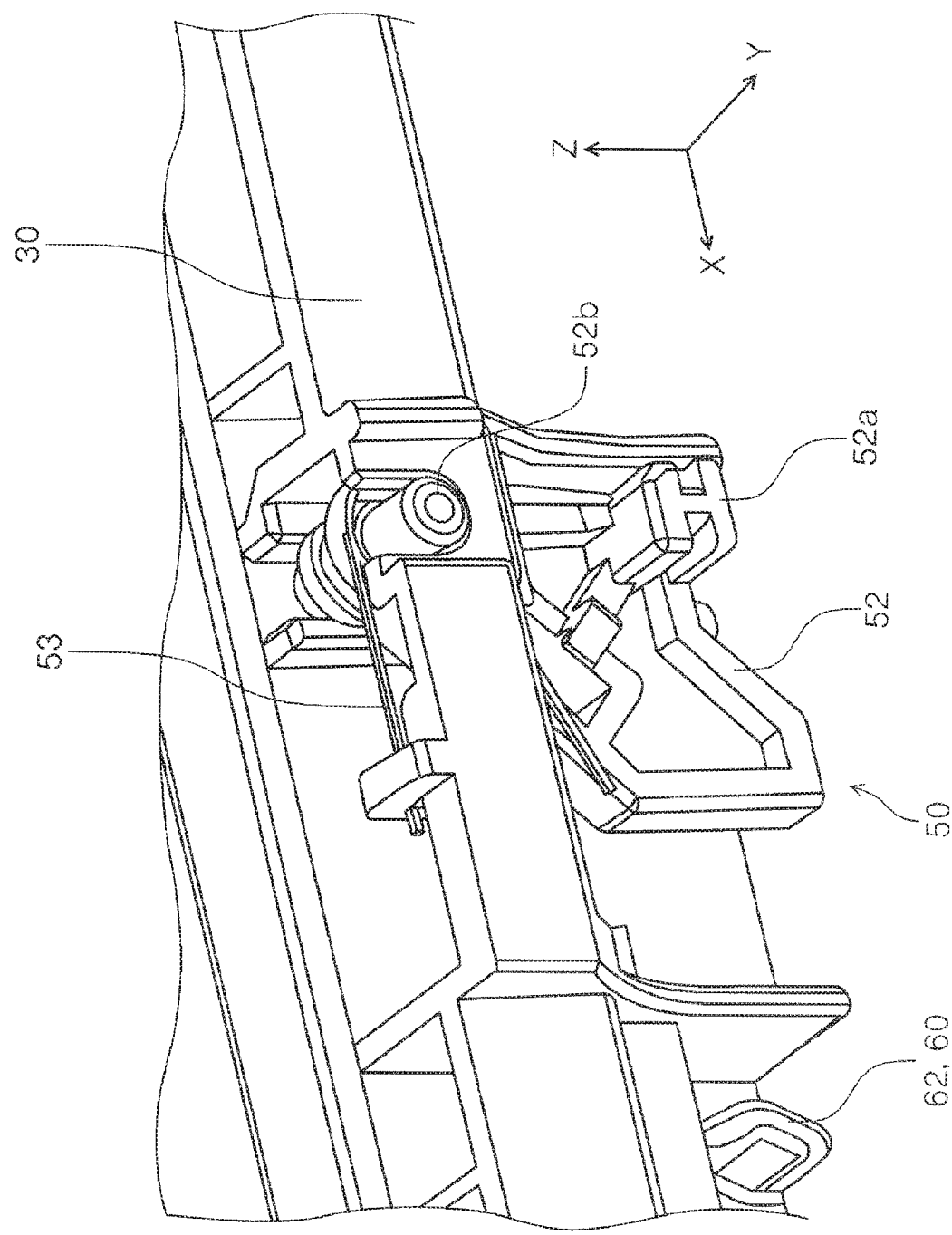
FIG. 13 is an enlarged perspective view of a main part of the scanner unit.

The posture holding unit 50 includes a recess portion 51 illustrated in FIGS. 8 and 9, a rotation member 52 and a pressing member 53 illustrated in FIG. 13, and a contact portion 54 illustrated in FIG. 7.

As illustrated in FIGS. 8 and 9, the recess portion 51 is provided on the rear surface of the panel unit 13 to be opened in the +X direction.

Figure 12:
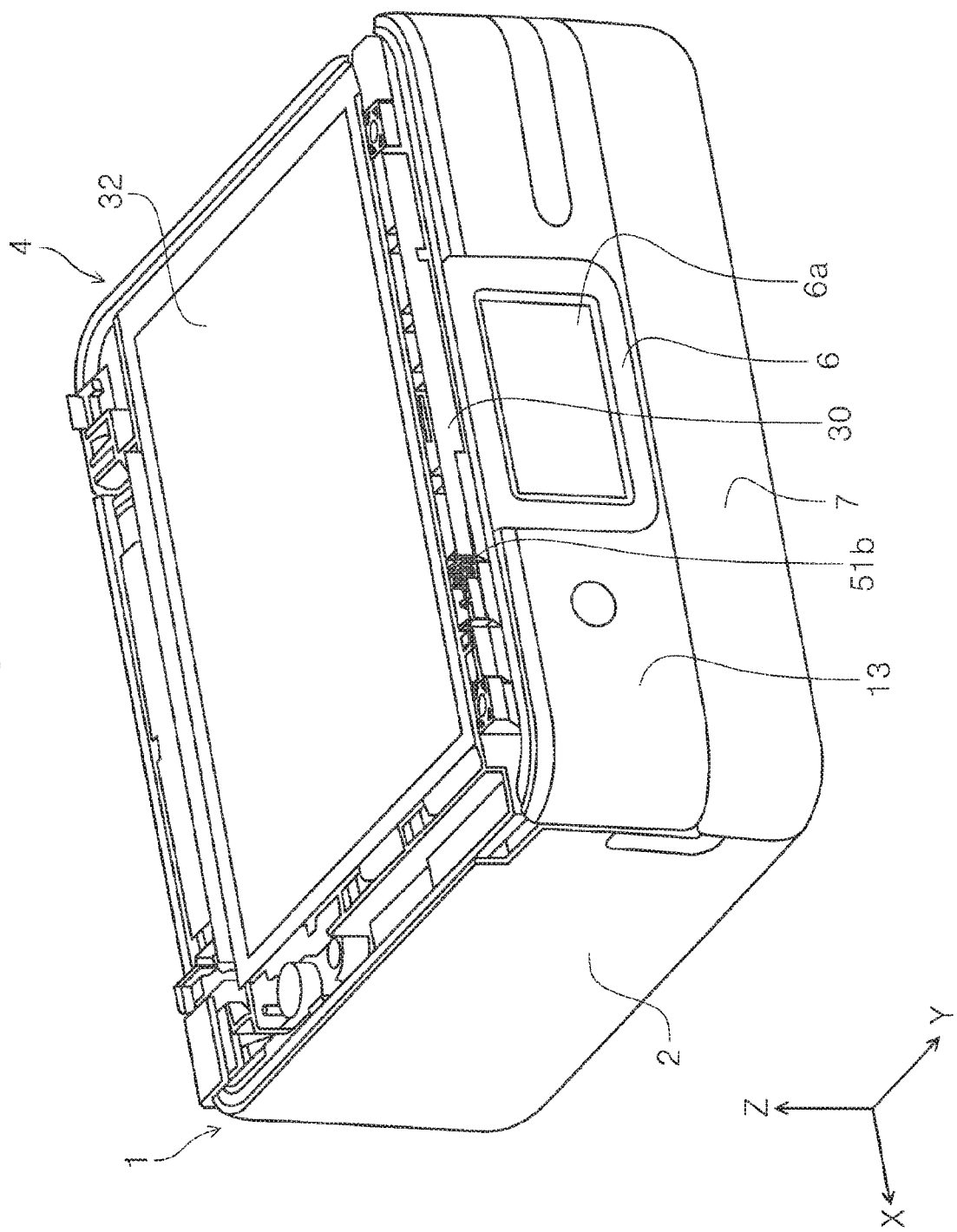
FIG. 12 is a perspective view illustrating a state in which the document stand cover and a frame member are removed from the printer according to the first embodiment.
Figure 16:
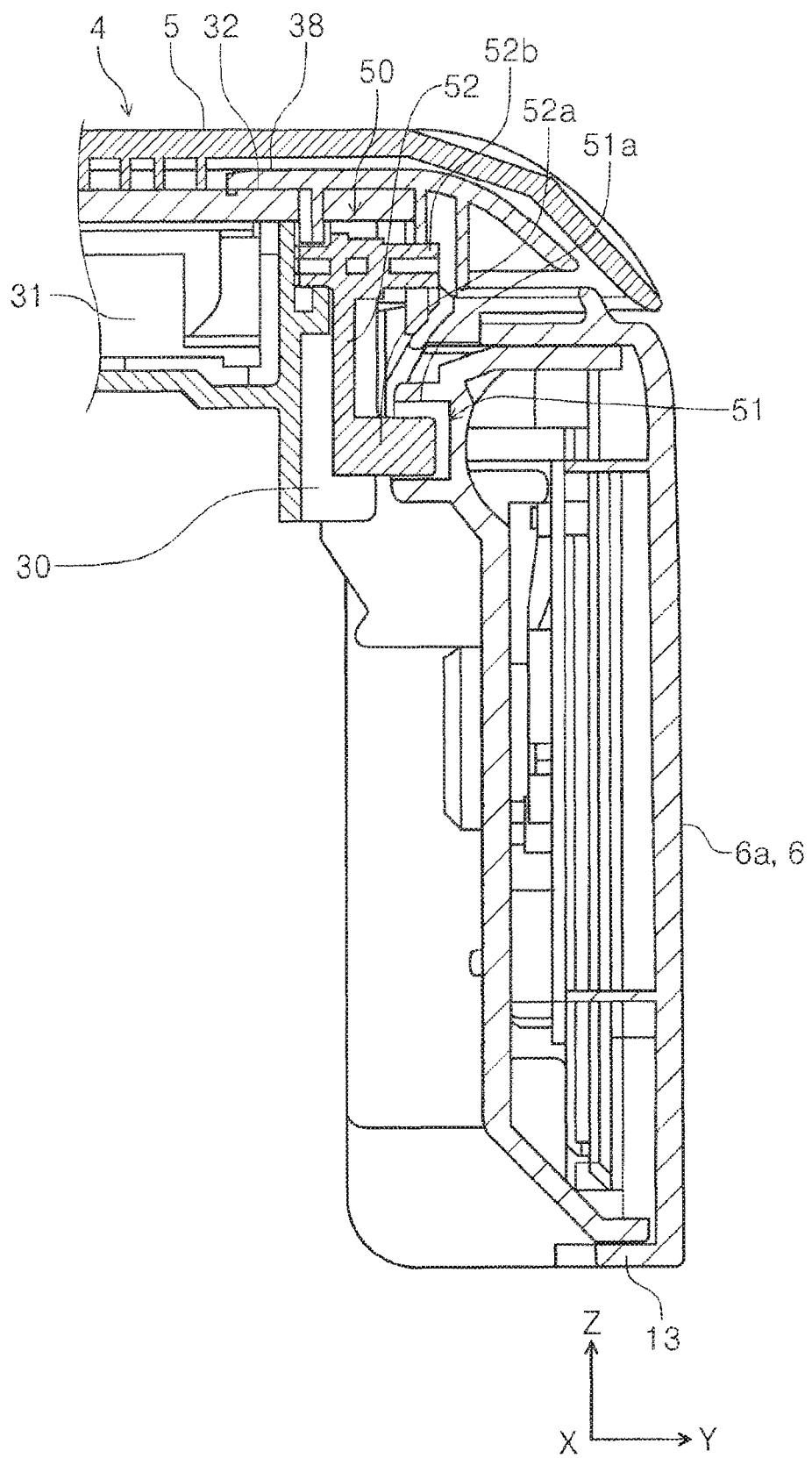
FIG. 16 is a sectional view illustrating the posture holding unit when the scanner unit is opened.
Figure 17:
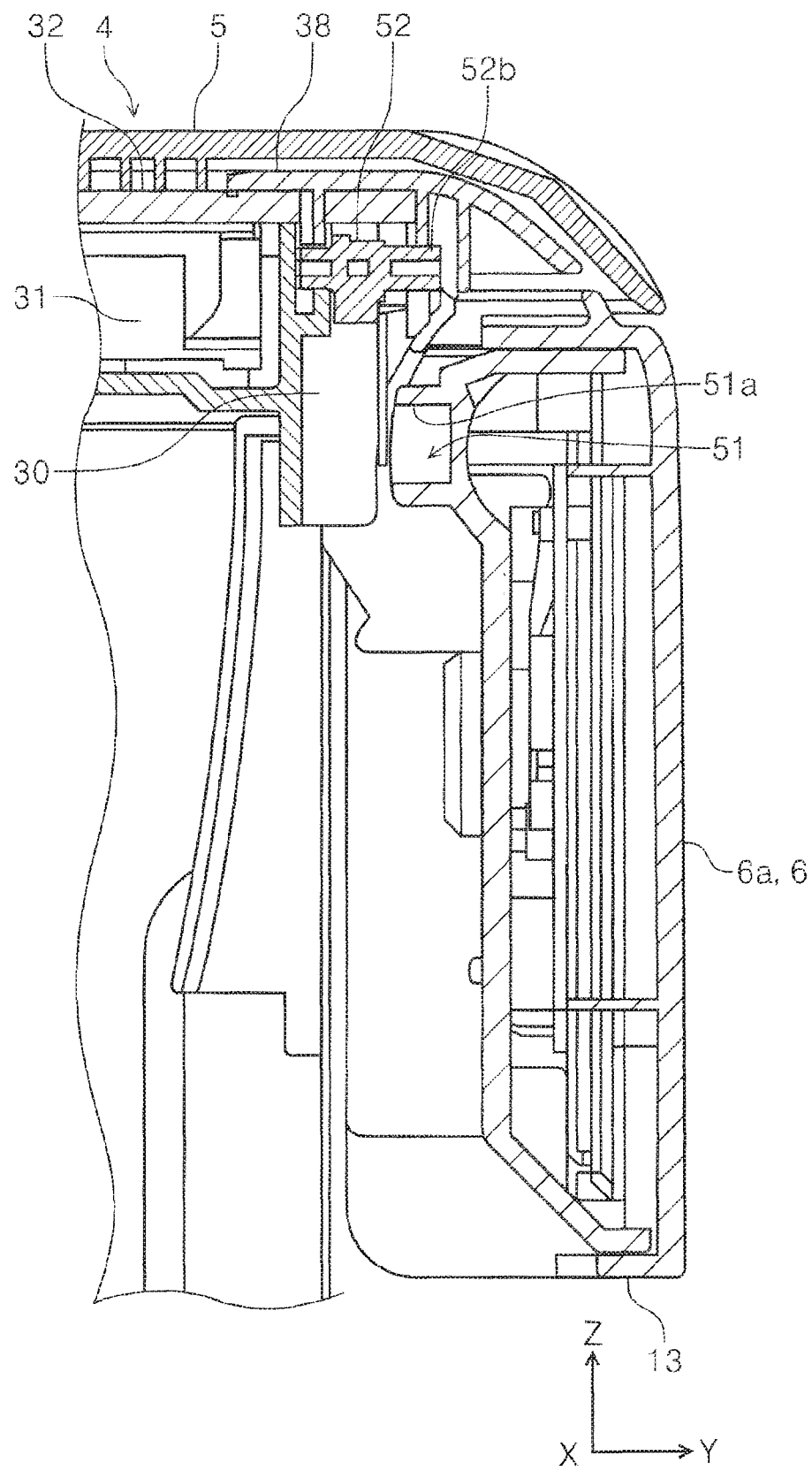
FIG. 17 is a front view illustrating the posture holding unit when the scanner unit is in the closed state.

The rotation member 52 illustrated in FIG. 13 includes a rotary shaft 52b (see also FIG. 12) that rotates with respect to the scanner body 30 of the scanner unit 4 and includes a protrusion portion 52a that can be inserted and extracted into and from the recess portion 51 through rotation. FIGS. 14 and 16 illustrate a state in which the protrusion portion 52a is inserted into the recess portion 51, and FIGS. 15 and 17 illustrate a state in which the protrusion portion 52a is extracted from the recess portion 51. Further, FIG. 12 illustrates a state in which in order to easily see the rotary shaft 52b provided in the scanner unit 4, the frame member 38 and the document stand cover 5 are removed from the printer 1.

The pressing member 53 illustrated in FIG. 13 presses the rotation member 52 in an arrow +A direction in which the protrusion portion 52a is inserted into the recess portion 51 as illustrated in FIG. 14. As an example, a torsion coil spring can be used as the pressing member 53. As illustrated in FIG. 7, the contact portion 54 is provided at an upper portion of the front surface 2a of the housing 2 and is disposed to be able to contact the rotation member 52 in a state in which the scanner unit 4 is closed.

Then, the posture holding unit 50 is in the posture holding state in which the protrusion portion 52a of the rotation member 52 is inserted into the recess portion 51 by a pressing force of the pressing member 53 and the panel unit 13 is held in the first posture, when the scanner unit 4 is in an opened state, and is in the tiltable state in which the contact portion 54 comes into contact with the rotation member 52, the rotation member 52 is rotated in an arrow −A direction illustrated in FIG. 14 against the pressing force of the pressing member 53, the protrusion portion 52a is extracted from the recess portion 51, and thus the panel unit 13 can be tilted, when the scanner unit 4 is closed from the opened state.

As illustrated in FIGS. 14 and 16, when the protrusion portion 52a of the rotation member 52 is inserted into the recess portion 51, if the panel unit 13 is to be rotated upward, the protrusion portion 52a interferes with a restriction surface 51a of the recess portion 51 illustrated in FIG. 16, so that the rotation of the panel unit 13 is restricted. Therefore, the panel unit 13 can be held in the first posture.

As illustrated in FIGS. 15 and 17, when the protrusion portion 52a of the rotation member 52 is extracted from the recess portion 51, even if the panel unit 13 is rotated upward, the protrusion portion 52a and the restriction surface 51a do not interfere with each other, so that the panel unit 13 can be tilted. That is, the panel unit 13 is in the tiltable state.

With this configuration, the posture holding unit 50 that switches between the posture holding state and the tiltable state of the panel unit 13 in conjunction with the opening and closing of the scanner unit 4 can be formed with a simple configuration.

Figure 18:
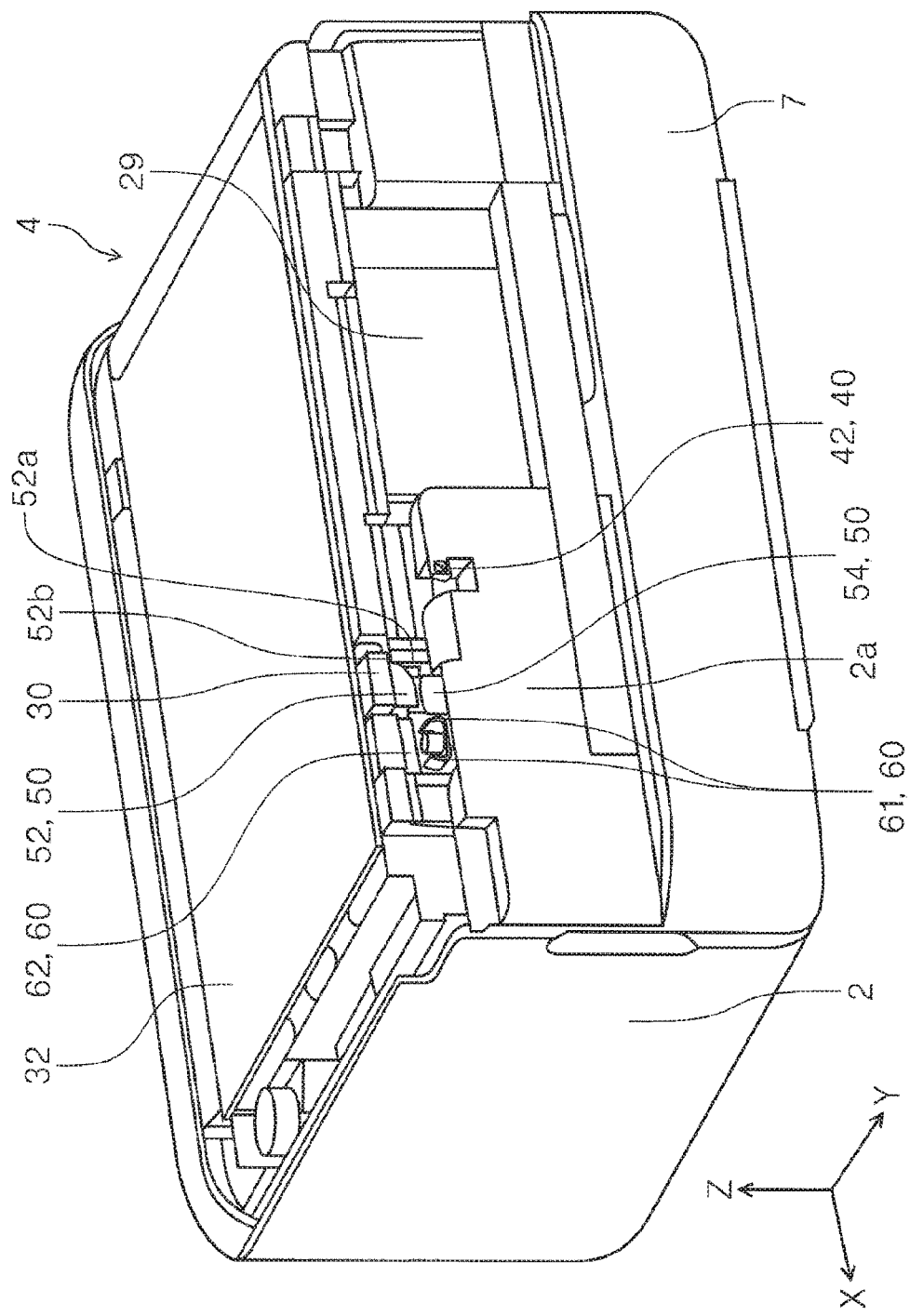
FIG. 18 is a perspective view illustrating a state in which the document stand cover, the frame member, and the panel unit are removed from the printer according to the first embodiment.
Figure 19:
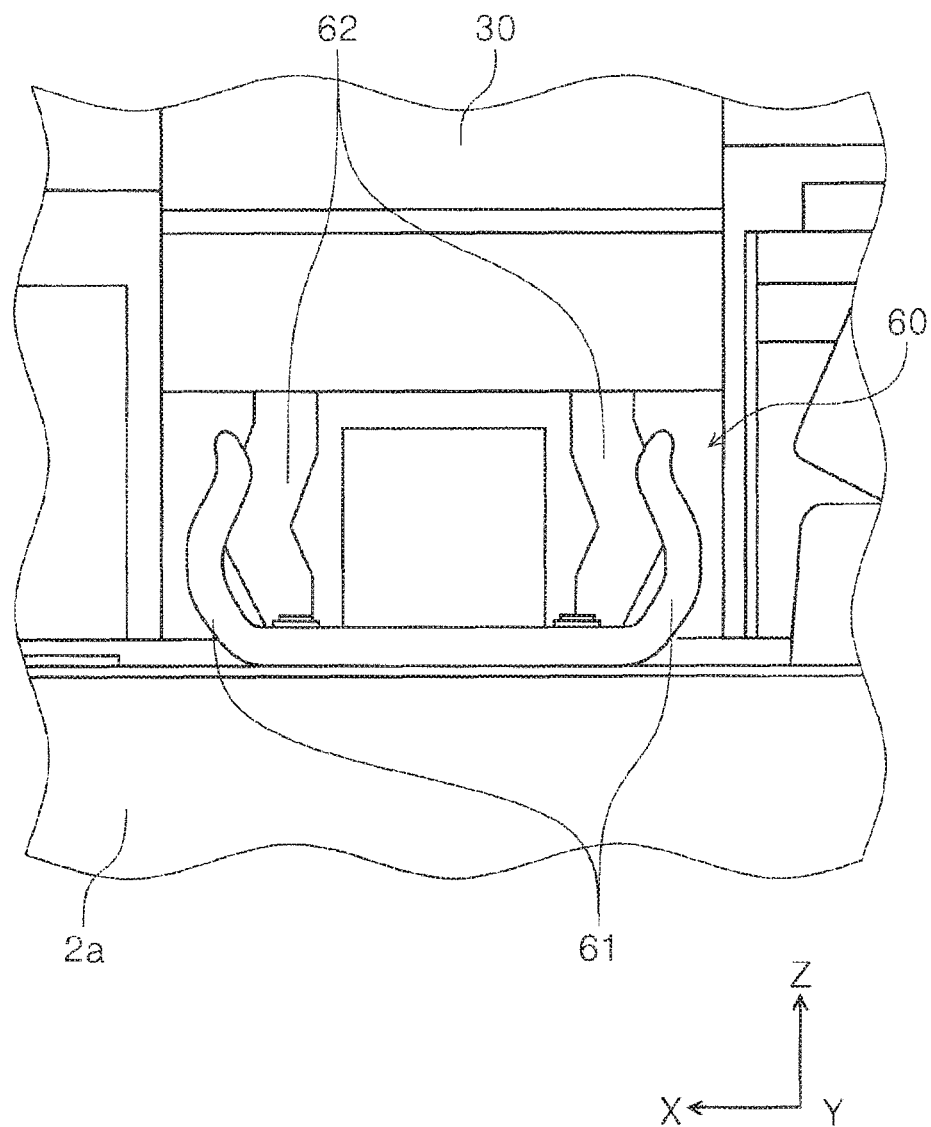
FIG. 19 is an enlarged view of a scanner holding unit.

Further, the printer 1 is provided with a scanner holding unit 60 that holds the closed state of the scanner unit 4 as illustrated in FIGS. 18 and 19.

As illustrated in FIG. 19, the scanner holding unit 60 includes an elastically deformable reception unit 61 (see also FIG. 7) provided in the housing 2 and a to-be-received unit 62 provided in the scanner unit 4 and received by the reception unit 61 while elastically deforming the reception unit 61. The scanner holding unit 60 is configured to, when the scanner unit 4 is in the closed state, hold the scanner unit 4 in the closed state against a force of tilting the panel unit 13 from the first posture as the to-be-received unit 62 is received by the reception unit 61 as illustrated in FIGS. 18 and 19.

When the panel unit 13 is provided in the scanner unit 4, the scanner unit 4 may be opened by an upward force that attempts to tilt the panel unit 13 from the first posture. As the scanner holding unit 60 is provided, the scanner unit 4 can be prevented from being inadvertently opened when the panel unit 13 is tilted.

Further, the to-be-received unit 62 may be provided in one of the housing 2 and the scanner unit 4 in which the reception unit 61 is not provided. For example, the reception unit 61 may be provided in the scanner unit 4 and the to-be-received unit 62 may be provided in the housing 2.

Modification example of restriction unit or posture holding unit

Further, a plurality of the restriction units 40 can be provided in the width direction (the X axis direction). For example, two hook portions 41 can be provided to sandwich the central portion C of the panel unit 13 illustrated in FIG. 8 in the width direction, and two restriction portions 42 can be provided at positions of the housing 2, corresponding to the hook portions 41, in the width direction. As the plurality of restriction units 40 are provided, the rotation of the scanner unit 4 can be more reliably suppressed.

Further, the restriction unit 40 is not limited to the configuration including the hook portion 41 and the restriction portion 42. For example, the restriction unit can be configured to include a locking pin that moves forward and rearward with respect to a hole provided in the scanner unit, a solenoid that moves the locking pin forward and rearward, and a control unit that controls the solenoid. Further, the restriction unit can be configured to include an encoder that detects an opening angle of the panel unit. When the panel unit 13 is in the first posture, the control unit fits the locking pin in the hole of the scanner unit and locks the locking pin, so that the restriction unit 40 is in the restriction state. Further, when the panel unit 13 is in the tilted posture, the locking pin is removed from the hole and is unlocked, so that the restriction unit 40 is in the rotation allowing state.

Further, in the posture holding unit 50, the pressing member 53 and the contact portion 54 are omitted, and the rotation member 52 is rotated by a motor that rotates the rotation member 52 and a control unit that controls the motor, so that the insertion and the extraction of the protrusion portion 52a into and from the recess portion 51 can be switched.

In Liquid Storage Unit

In the printer 1, the liquid storage unit 24 mounted on the carriage 20 illustrated in FIG. 3 can be replenished with the ink that has been reduced by the recording.

The printer 1 is configured such that the ink can be replenished in the liquid storage unit 24 in a state in which the scanner unit 4 is opened as illustrated in FIG. 3.

Figure 4:
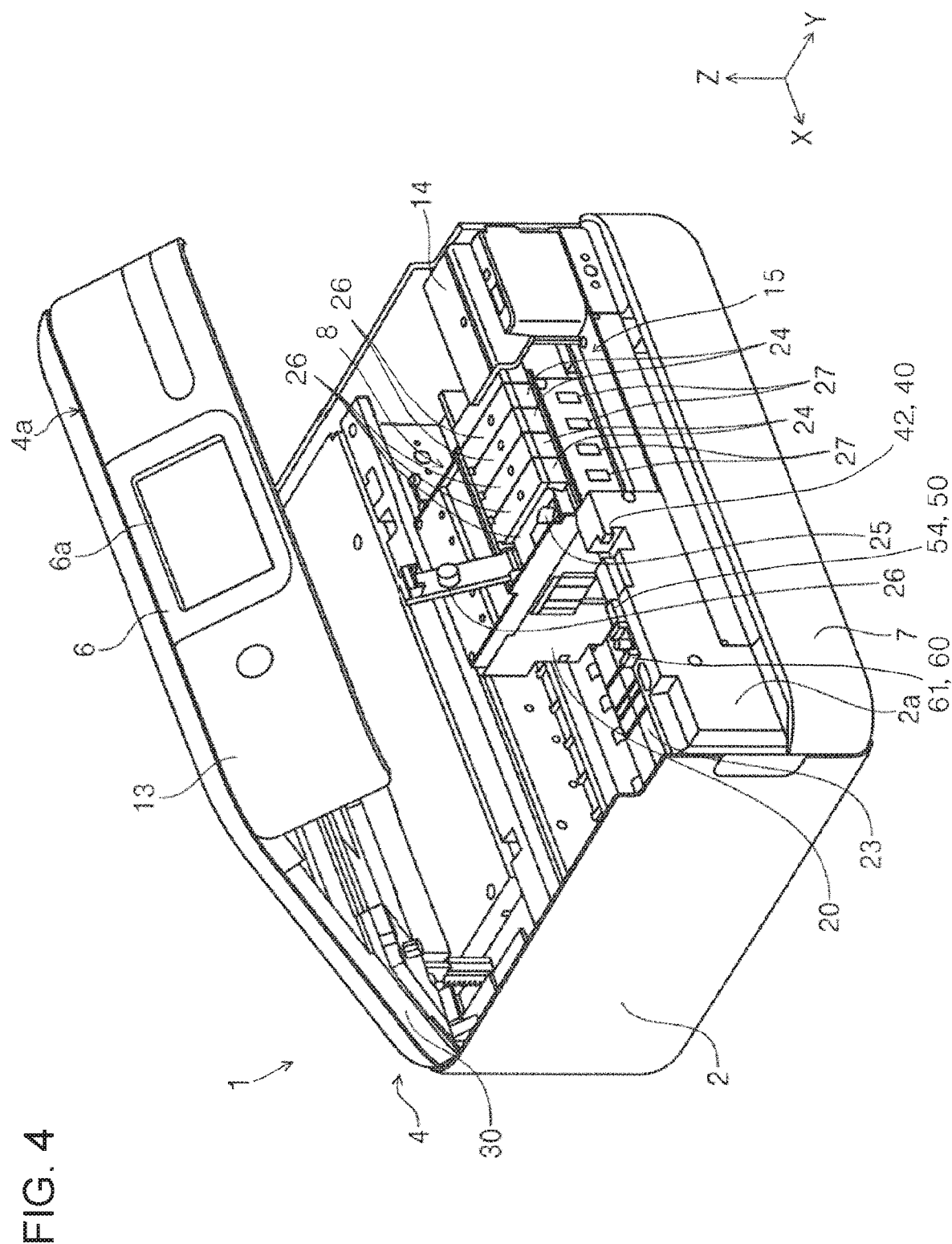
FIG. 4 is a perspective view illustrating a state in which the scanner unit is completely opened and a carriage is moved a position where a liquid storage unit is replenished with an ink, in the printer according to the first embodiment.

A plurality of the liquid storage units 24 corresponding to a plurality of colors are mounted on the carriage 20. A cap 26 for closing an ink supply port 25 illustrated in FIG. 4 is provided on each liquid storage unit 24. FIG. 4 illustrates a state in which the cap 26 of the leftmost liquid storage unit 24 is opened when the drawing is viewed from the front side. The cap 26 opens and closes the ink supply port 25 by rotating about the rearward direction with respect to the apparatus (the −Y direction). The ink can be filled into the liquid storage unit 24 from the ink supply port 25.

In FIG. 3, the carriage 20 is located at a home position. The home position is provided at one end of a moving area of the carriage 20, and is set at an end in the −X direction in the present embodiment.

An eaves member 14 is provided in front of the housing 2 in the −X direction, and when the carriage 20 is located at the home position, the liquid storage unit 24 with the cap 26 closed is located below the eaves member 14. The carriage 20 can be located at the home position by the eaves member 14 with the cap 26 securely closed.

Since the eaves member 14 exists, the cap 26 of the liquid storage unit 24 cannot be opened when the carriage 20 is located at the hoe position. When the liquid storage unit 24 is replenished with the ink, for example, an ink replenishment mode is selected in the manipulation unit 6, so that the carriage 20 can be moved to a position where the cap 26 is not covered by the eaves member 14 illustrated in FIG. 4.

In the present embodiment, in a state in which the scanner unit 4 is opened by the restriction unit 40 and the posture holding unit 50 described above, the panel unit 13 is held at an angle at which the user is easy to see the manipulation surface 6a of the manipulation unit 6. Therefore, when the liquid storage unit 24 is replenished with the ink, good manipulability can be ensured.

As illustrated in FIG. 3, a notch portion 15 is provided on the front surface 2a of the housing 2. A window portion 27 that can visually recognize the amount of the ink therein is provided on a side surface of the liquid storage unit 24 in the +Y direction. In the ink replenishment mode, the carriage 20 is moved to a position the carriage 20 overlaps the notch portion 15 in the X-axis direction as illustrated in FIG. 4. Accordingly, the ink can be replenished while checking the amount of the ink in the liquid storage unit 24.

When the replenishment of the ink is completed, for example, the ink replenishment mode is terminated in the manipulation unit 6, so that the carriage 20 can return to the home position. Further, it is detected that the scanner unit 4 is closed with respect to the housing 2, and the carriage 20 returns to the home position using the detection result as a trigger.

Further, the scanner unit 4 is provided with a cover member 29 that closes the notch portion 15 in the closed state of the scanner unit 4 as illustrated in FIG. 18. FIG. 18 illustrates a state in which the frame member 38, the document stand cover 5, and the panel unit 13 are removed from the printer 1. As illustrated in FIG. 20, the cover member 29 is provided in the scanner unit 4 to be located on the rear side (the −Y direction) of the panel unit 13.

As the cover member 29 is provided, the notch portion 15 is covered with the cover member 29 in the closed state of the scanner unit 4, so that ink mist generated when the recording is performed in the printer 1 can be suppressed from adhering to the rear surface of the panel unit 13.

Hereinabove, the embodiment of the present disclosure has been described. However, it is apparent that the present disclosure is not limited to the above-described embodiments, various modifications can be made without departing from the scope of the present disclosure described in the appended claims, and the modifications are also included in the scope of the present disclosure.

What is claimed is:

1. A recording apparatus comprising:
   a recording unit that performs recording on a medium;
   a housing including the recording unit therein;
   a scanner unit that includes a document stand on which a document is placed and a reading unit that reads the document placed on the document stand, is provided to be rotatable with respect to the housing, and is configured to open and close an upper portion of the housing through rotation;
   a panel unit that is provided in a free end of the scanner unit and is configured to be tilted between a first posture and a second posture in which the panel unit is more parallel to the document stand than the first posture;
   a restriction unit that is configured to switch between a restriction state in which rotation of the scanner unit in an opening direction from a closed state in which the scanner unit is closed with respect to the housing is restricted and a rotation allowing state in which the rotating of the scanner unit in the opening direction from the closed state is allowed, the restriction unit being in the rotation allowing state when the panel unit is in the first posture and being in the restriction state when the panel unit is tilted from the first posture to the second posture; and
   a posture holding unit that is configured to switch between a posture holding state in which a posture of the panel unit with respect to the scanner unit is held in the first posture and a tiltable state in which the posture of the panel unit with respect to the scanner unit is configured to be tilted from the first posture to the second posture, the posture holding unit being switched to the tiltable state when the scanner unit is in the closed state and being switched to the posture holding state when the scanner unit is rotated in the opening direction from the closed state.

2. The recording apparatus according to claim 1, wherein the restriction unit includes a hook portion that is provided in the panel unit and is displaced following rotation of the panel unit and a restriction portion that is provided in the housing and restricts the rotation of the scanner unit with respect to the housing by hooking the hook portion, and
   the restriction unit is in the rotation allowing state as the hook portion is detached from the restriction portion when the panel unit is in the first posture, and is in the restriction state as the hook portion is hooked by the restriction portion when the panel unit is tilted from the first posture to the second posture.

3. The recording apparatus according to claim 1, further comprising:
   a scanner holding unit including
      an elastically deformable reception unit that is provided in one of the housing and the scanner unit, and
      a to-be-received unit that is provided in the other one of the housing and the scanner unit where the reception unit is not provided and is received by the reception unit while the reception unit is elastically deformed, wherein
   as the to-be-received unit is received by the reception unit when the scanner unit is in the closed state, the scanner unit is held in the closed state against a force of tilting the panel unit from the first posture to the second posture.

4. The recording apparatus according to claim 1, wherein the posture holding unit includes
   a recess portion that is provided in the panel unit,
   a rotation member that includes a protrusion portion configured to be inserted and extracted into and from the recess portion through rotation with respect to the scanner unit,
   a pressing member that presses the rotation member in a direction in which the protrusion portion is inserted into the recess portion, and
   a contact portion that is provided in the housing and is configured to contact the rotation member in a state in which the scanner unit is closed, wherein
   when the scanner unit is in an open state, the protrusion portion is inserted into the recess portion by a pressing force of the pressing member, so that the panel unit is in the posture holding state, and
   when the scanner unit is closed from the open state, the contact portion rotates the rotation member against the pressing force of the pressing member and the protrusion portion is extracted from the recess portion, so that the panel unit is in the tiltable state.

5. The recording apparatus according to claim 1, wherein the recording unit includes a recording head that ejects a liquid, and is configured to perform recording by ejecting the liquid from the recording head to the medium, and
   the housing includes a liquid storage unit therein that stores the liquid, and is configured such that when the scanner unit is in the open state, the liquid storage unit is configured to be replenished with the liquid.

6. The recording apparatus according to claim 5, wherein the recording unit includes a carriage which supports the recording head and on which the liquid storage unit is configured to be mounted.

* * * * *